United States Patent [19]

Elko et al.

[11] Patent Number: 5,457,793
[45] Date of Patent: Oct. 10, 1995

[54] SOFTWARE CACHE MANAGEMENT OF A SHARED ELECTRONIC STORE IN A SUPPLEX

[75] Inventors: David A. Elko, Poughkeepsie; Jeffrey A. Frey, Fishkill; Brian B. Moore, Poughkeepsie; Jeffrey M. Nick, Fishkill, all of N.Y.; Kevin F. Smith, San Jose, Calif.; Michael D. Swanson, Poughkeepsie, N.Y.

[73] Assignee: International Business Machines Corporation, Armonk, N.Y.

[21] Appl. No.: 860,807

[22] Filed: Mar. 30, 1992

[51] Int. Cl.$^6$ .......................... G06F 15/167; G06F 17/30
[52] U.S. Cl. .......................... 395/600; 395/425; 395/800; 395/280; 395/427; 364/228.1; 364/229.0; 364/243.41; 364/246.12; 364/DIG. 1; 364/931.46; 364/964.2; 364/DIG. 2
[58] Field of Search .................................. 395/425, 325, 395/800, 400, 650

[56] References Cited

U.S. PATENT DOCUMENTS

| | | | |
|---|---|---|---|
| 4,445,174 | 4/1984 | Fletcher | 395/425 |
| 4,463,424 | 7/1984 | Mattson et al. | 395/425 |
| 4,905,141 | 2/1990 | Brenza | 395/425 |
| 4,965,719 | 10/1990 | Shoens et al. | 395/650 |
| 5,123,101 | 6/1992 | Sindhu | 395/400 |
| 5,136,700 | 8/1992 | Thacker | 395/400 |
| 5,201,040 | 4/1993 | Wada et al. | 395/400 |

OTHER PUBLICATIONS

*PC Tools Version 7 for DOS: Data Recovery and System Utilities,* Central Point Software, pp. 159–170.

Primary Examiner—Thomas G. Black
Assistant Examiner—Paul R. Lintz
Attorney, Agent, or Firm—Bernard M. Goldman

[57] ABSTRACT

Storage is managed in a shared electronic store (SES) by assigning storage classes (STCs) to each directory entry having a data item stored in SES. The assignments of directory entries and data elements to the respective STCs can be changed at any time by any CPC. Eventually, no free space remains in the SES cache, and then space for new directory entries and data items must be obtained by reclaiming space occupied by directory entries and associated unchanged data items. The reclaiming of SES space is controlled on a STC basis. Any specified STC may reclaim from itself or from another STC using reclaiming software/microcode in SES, which includes a reclaim vector, a reclaim counter, a queue, and reclaiming controls. The vector and counter have respective elements for all possible STCs to controls how a specified STC may reclaim space from any or all target STC. Any enabled target STC reclaims its space according to an LRU algorithm maintained by a queue for the STC. A CPC can issue a command to load different values in target STC elements in the SES vector for a specified STC to control how reclaiming is apportioned for the specified STC. In SES, associated target counter elements are loaded from its vector. Reclaiming is done automatically in SES upon each directory miss in the current target STC having a non-zero counter value, when no free space exists. The counter is decremented for each reclaimed directory entry until its count reaches zero, and then the counter element for the next non-zero target STC is used for reclaiming until it reaches zero. When all STC elements in the counter are zero for the specified STC, the counter elements are reloaded from the vector elements to repeat the reclaiming operation, as long as a repeat factor for the specified STC has not reached zero. The repeat factor is decremented each time the counters are loaded from the vector. When the counters and repeat factor have all reached zero, reclaiming is disabled for the specified STC.

50 Claims, 19 Drawing Sheets

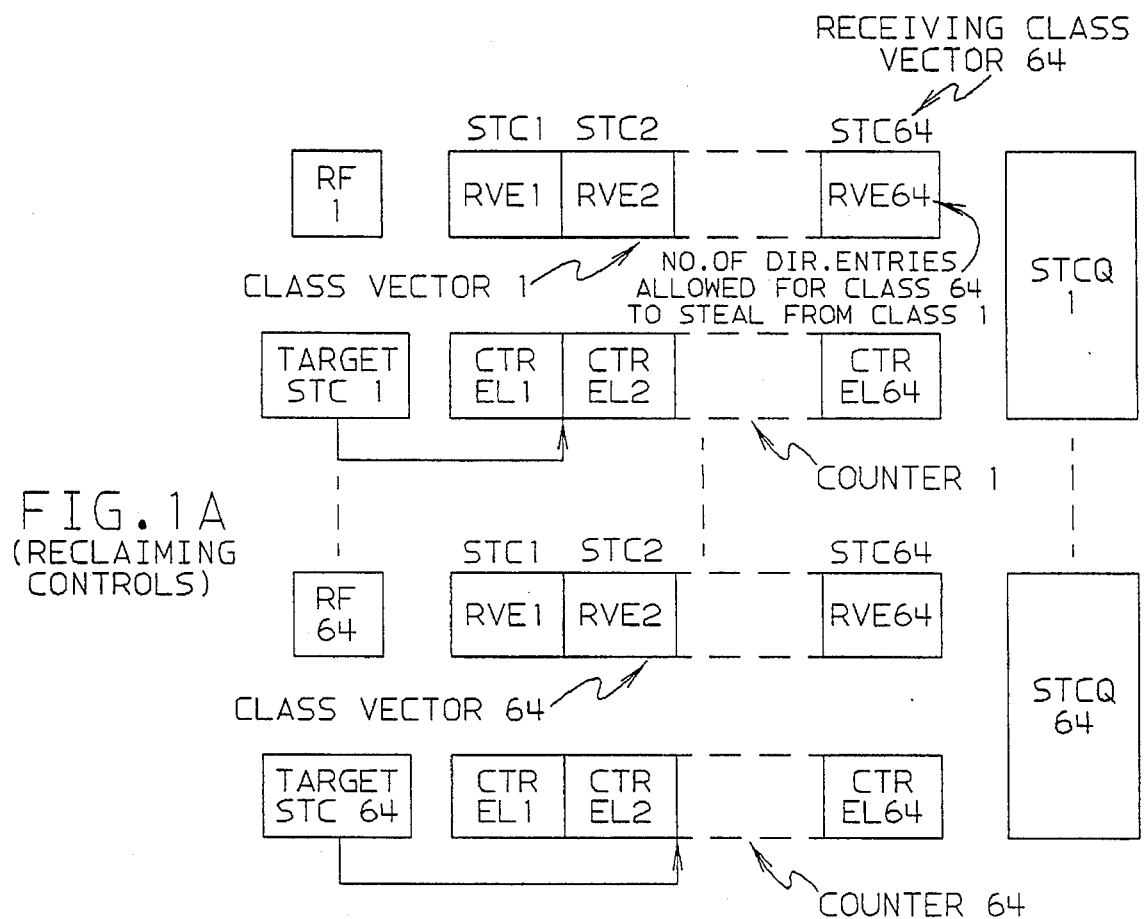
FIG.1A
(RECLAIMING CONTROLS)
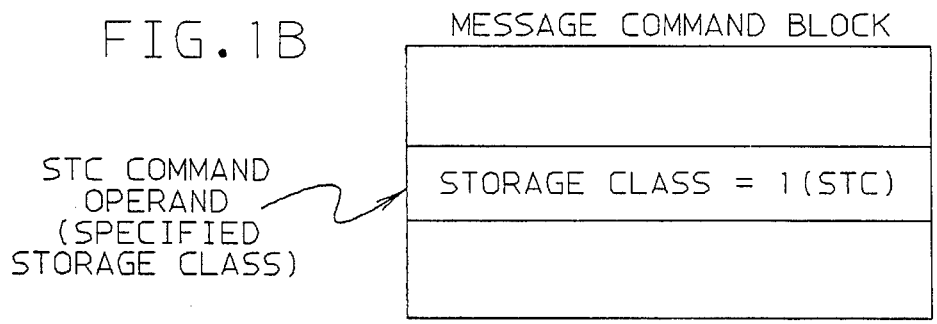
FIG.1B
STC COMMAND OPERAND (SPECIFIED STORAGE CLASS)
FIG.1C
DIRECTORY ENTRY INFORMATION BLOCK
| NAME | USED DATA FIELDS | ASSIGNED STORAGE CLASS | |
|---|---|---|---|

SOFTWARE CACHE MANAGEMENT OF A SHARED ELECTRONIC STORE IN A SUPPLEX

CROSS REFERENCE TO RELATED APPLICATIONS

This application contains subject matter which is related to the subject matter of the following applications which are assigned to the same assignee as this application:

"configurable, Recoverable Parallel Bus" by N. G. Barrow et al, Ser. No. 07/839,657, (Docket No. PO991066), Filed Feb. 20, 1992, U.S. Pat. No. 5,357,608, Issued Oct. 18, 1994.

"Communications System Having Plurality of Origination and Corresponding Recipient Buffers With Each Buffer Having Three Different Logical Areas for Transmitting Messages in Single Transfer" by N. G. Barrow et al, Ser. No. 07/839,652, (Docket No. PO991067), Filed Feb. 20, 1992.

"Frame-Group Transmission And Reception For Parallel/Serial Buses," by N. G. Bartow et al, Ser. No. 07,839,986 (Docket No. PO992001), Filed Feb. 20, 1992, U.S. Pat. No. 5,267,240, Issued Nov. 30, 1993.

SPECIFICATIONS INCORPORATED BY REFERENCE:

The entire specifications of the following listed applications are completely incorporated by reference as part of the subject application. Each of the following listed applications is owned by the same assignee as the subject application, is filed on the same day as the subject application, and has the same priority date as the subject application. They are:

"Communicating Messages Between Processors And A Coupling Facility" by D. A. Elko et al, Ser. No. 07/860,380, (Docket No. PO991006), Filed Mar. 30, 1992.

"Sysplex Shared Data Coherency Method and Means" by D. A. Elko et al, Ser. No. 07/860,805, (Docket No. PO991052), Filed Mar. 30, 1992.

"Method and Apparatus For Distributed Locking of Shared Data, Employing A Central Coupling Facility" by D. A. Elko et al, Ser. No. 07/860,808, (Docket No. PO991059), Filed Mar. 30, 1992, U.S. Pat. No. 5,339,427, Issued Aug. 16, 1994.

"Command Quiesce Function" by D. A. Elko et al, Ser. No. 07/860,330 (Docket No. PO991062), Filed Mar. 30, 1992, U.S. Pat. No. 5,339,405, Issued Aug. 16, 1994.

"Management Of Data Movement From A SES Cache To DASD" by D. A. Elko et al, Ser. No. 07/860,806, (Docket NO. PO991079), Filed Mar. 30, 1992.

"Command Retry System" by D. A. Elko et al, Ser. No. 07/860,378, (Docket No. PO992002), Filed Mar. 30, 1992, U.S. Pat. No. 5,392,397, Issued Feb. 21, 1995.

"Integrity of Data Objects Used To Maintain State Information For Shared Data At A Local Complex" by D. A. Elko et al, Ser. No. 07/860,800, (Docket No. PO992003), Filed Mar. 30, 1992, U.S. Pat. No. 5,331,673, Issued Jul. 19, 1994.

"Management Of Data Objects Used To Maintain State Information For Shared Data At A Local Complex" by J. A. Frey et al, Ser. No. 07/860,797, (Docket No. PO992004), Filed Mar. 30, 1992, U.S. Pat. No. 5,388,266, Issued Feb. 07, 1995.

"Recovery Of Data Objects Used To Maintain State Information For Shared Data At A Local Complex" by J. A. Frey et al, Ser. No. 07/860,647, (Docket No. PO992005), Filed Mar. 30, 1992, U.S. Pat. No. 5,394,542, Issued Feb. 28, 1995.

"Message Path Mechanism For Managing Connections Between Processors And A Coupling Facility" by D. A. Elko et al, Ser. No. 07/860,646, (Docket No. PO992006), Filed Mar. 30, 1992 (Abandoned); File Wrapper Continuation application Ser. No. 08/324,447, Filed Oct. 18, 1994.

"Data Processing System And Method For Providing Notification To A Central Processor of State Changes For Shared Data Structure On External Storage" by J. A. Frey et al, Ser. No. 07/860,809, (Docket No. PO992007), Filed Mar. 30, 1992, U.S. Pat. No. 5,390,328, Issued Feb. 14, 1995.

"Method And Apparatus For Performing Conditional Operations On Externally Shared Data" by D. A. Elko et al, Ser. No. 07/860,655 (Docket No. PO992008), Filed Mar. 30, 1992 (Abandoned); File Wrapper Continuation application Ser. No. 08/383,532, Filed Feb. 01, 1995.

"Apparatus And Method For List Management In A Coupled Data Processing System" by J. A. Frey et al, Ser. No. 07/860,633 (Docket No. PO992009), Filed Mar. 30, 1992.

"Interdicting I/O And Messaging Operations In A Multi-System Complex" by D. A. Elko et al, Ser. No. 07/860,489, (Docket. No. PO992010), Filed Mar. 30, 1992.

"Method And Apparatus For Coupling Data Processing Systems" by D. A. Elko et al, Ser. No. 07/860,803, (Docket No. PO992012), Filed Mar. 30, 1992, U.S. Pat. No. 5,317,739, Issued May 31, 1994.

INTRODUCTION

This invention provides a base for storage management in a shared electronic storage (SES). Instrumentation and basic controls are provided for controlling the storage reclaiming process and for controlling the allocation of controlled by a hypervisor system, such as the IBM PR/SM (processor resource/system manager). A PR/SM controlled system divides up the CPU, storage and I/O resources of the system among a plurality of partitions. Each resource partition generally contains and is controlled by an operating system (a software control program) that controls the computer operations within the partition. The PR/SM partitions are isolated from each other so that the various OSs running in the different partitions do not interfere with each other, so that they run without conflict and without compromising security in their operation. The sysplex DASD is connected in common to all partitions containing OSs attached to SES. Different features and methods used in the IBM PR/SM are described and claimed in U.S. Pat. No. 4,843,541 (PO9-87-002), U.S. patent Ser. No. 5,222,215, and Ser. No. 5,257,379, each assigned to the same assignee as the subject application.

To provide shareable data items in SES, any of its attached CPCs may access a data item from DASD, and then issue a write command to SES to write the data item in SES. The data item is sent by the CPC to SES with a write command. Any attached CPC may issue a read command to SES to read any data item stored in SES to provide sharing of the data item among the attached CPCs.

The sysplex DASDs contain a copy of sharable data items in the sysplex. SES generally will not contain a copy of all data items in the sysplex because the storage capacity of SES is generally less than the DASD capacity. Although the data items stored in SES may be copies of the same data items in DASD (i.e. a "changed" data item), the copy stored in SES may be a different (and updated) version of the same data item stored in DASD (i.e. a "changed" data item).

A CPC accessing a data item from DASD is not required to store the data item in SES. However, each attached CPC is required to "register" in SES all of its shared DASD data items, because SES is also required to control the data coherency of shared data items in the sysplex, including the data coherency of data items not stored in SES. The SES data coherency operation is described and claimed in U.S. patent application Ser. No. 07/860,805 (PO9-91-052) which is a continuation-in-part of U.S. patent application Ser. No. 07/628,211 (SA9-90-093) filed Dec. 14, 1990, U.S. Pat. No. 5,276,835 issued Jan. 1, 1994 both being assigned to the same assignee as the subject application.

Registration is done by SES storing an identification of the CPC buffer containing the data item (such as in a SES directory entry which is storing the name of the data item). If no directory entry is found associated with the name of the data item, the registration process allocates a directory entry and stores in it the name of the data item accessed from DASD.

The SES registration is done whether or not the data item is stored in SES, or whether or not the registering CPC intends to have the data item stored in SES. The directory entry used for the purposes of registering interest in a data item name may indicate the data item currently has a number of copies stored in multiple CPC buffers distributed among various CPCs.

Whenever a CPC changes a sharable data item, the CPC MUST command SES to invalidate EACH OTHER copy of that data item in any other CPC buffer.

If a data item is changed in a CPC buffer, sysplex efficiency is significantly improved if the CPC stores the UPDATED data item into the attached SES cache, because it is much faster for other CPCs to obtain an updated data item from SES than to obtain it from DASD.

Only non-sharable data items need not be registered in an attached SES cache. A non-sharable data item is one that only can be used within the CPC accessing it.

BACKGROUND

The apportionment of storage resources has been done in the prior art within a system complex, such as in the IBM MVS/System Resource Manager (SRM), which controls the allocation of storage and other resources to executing tasks in the computer system. Storage is apportioned among a plurality of domains by swapping pages of data between main storage and a DASD (direct access storage device), based on measurements and resulting calculations made over each of periodic time intervals.

U.S. Pat. Nos. 3,702,006 and 4,183,083 are examples of the load balancing of I/O device operations, in which counts over a time interval are periodically used to compute the allocation of tasks to the I/O devices.

Hardware cache storage and system main storage have been managed using the reclaiming of space on a least recently used (LRU) basis. The IBM/MVS operating system has freed space in the main memory of computer systems by swapping out pages of data to DASD. Thresholds have been used to determine when reclaiming should be done to free space in advance of when memory becomes full. Such data management processes are being used to control reclaiming of storage space using LRU selection of pages to be reclaimed for replacement by new data.

The term "class" has previously been used in record processing control, such as in the VM/370 spool file class for controlling printing, punching and networking operations. However, it has never been known to have been used in relation to storage control processing within any SES type of entity.

The subject invention builds on the prior art to obtain not obvious improvements.

SUMMARY OF THE INVENTION

The invention relates to storage control in a SES (shared electronic store) which initially contains a large amount of storage not in a condition to be used as a SES cache. This invention initially structures the SES storage using software in and commands issued by a CPC (central processing complex) in the sysplex. The software specifies the quantity of SES storage space for a cache directory, cache data area, and cache controls (tables) being set up as the SES cache. These special CPC commands (which are issued to SES to initially structure the SES cache) can also be used to deallocate the cache whenever it is no longer needed. These cache allocation commands may be used to structure more than one cache in a single SES entity, and change their number at any future time.

Initially, the storage space in an allocated SES cache not used for control tables is put into a pool of free space. A single pool may be used for all free space, or separate pools may be used for allocating different uses of the space, such as providing a directory free pool for providing space for new SES cache directory entries and a data area free pool for providing space for data items being stored in the SES cache.

Eventually, all of the space in a free pool is allocated and no free space is available for a new directory entry being requested by a CPC command. Then, cache space containing valid information must be reclaimed for each new request not finding adequate space, by invalidating currently valid space and reallocating the space to the new request. The reclaiming process provides SES space for storing new directory entries, for storing new data items and for increasing the size of existing data items.

This invention provides hardware/microcode reclaiming controls used by the SES reclaiming process which use storage classes assigned by the CPCs and utilized in a unique manner to manage storage re-allocation in SES. SES not only includes RAM storage but also includes one or more processors or micro-processors executing programs and/or micro-programs which are initiated by the CPC commands to perform storage control processes described herein.

The SES reclaim controls support some maximum number of storage classes set up during the allocation structuring of a SES cache. At different times during the operation of a SES cache, variable numbers of storage classes may be in use. The storage classes in use at any time are indicated in storage class fields in current SES cache directory entries.

The reclaim controls provided for each supported storage class include a reclaiming vector, a reclaiming cursor, an associated reclaiming counter and a recency queue. Each reclaiming vector contains a plurality of vector elements, one vector element for each of the supported storage classes. And the associated reclaiming counter contains an equal plurality of counter elements corresponding to the vector elements in the associated vector. Under control of a particular CPC command to SES, the elements in the vector for a selected storage class are initialized with values, and the respective counter elements are loaded with the values contained in the corresponding vector elements. The recency queue for each storage class represents all directory entries in the storage class in the SES cache, ordered according to the recency of access. The queue representations in each directory entry are threaded in two different ways; one thread connects only the entries representing unchanged data items in the storage class, and the other thread connects all entries in the storage class (representing both changed and unchanged data items). The header for the queue of each storage class may locate both the LRU (least recently used) entry in the unchanged thread and the LRU entry in the changed/unchanged thread. Only the LRU directory entry for the unchanged thread (and any SES stored data item it may locate) is subject to reclaiming in any storage class.

At any time, less than all supported reclaiming vectors (and corresponding counters) may be in effective use, as determined by the number of actual storage classes in use in the cache at the moment.

The reclaiming controls for any supported storage class may be activated by a CPC command. When activated, the controls for a specified storage class perform "on-demand" reclaiming of storage space from one or more enabled (target) storage classes for the specified storage class. Each reclaiming operation increases the size of the specified storage class at the expense of a target storage class, which is correspondingly decreased in size.

The specification of target storage classes is done by a CPC command to SES. The CPC command is set up by CPC software which issues the command to SES. The CPC command may enable any existing storage class as a target storage class for any specified storage class.

Accordingly, a "specified storage class" is any storage class RECEIVING storage space released by a reclaiming operation. And a "target storage class" is any storage class RELEASING (invalidating) storage space for use by the specified storage class in a reclaiming operation. Thus, a reclaiming operation is considered to "steal" space from a target storage class for the benefit of the specified storage class. Any or all of the in use storage classes may be made to operate as target storage classes, including the specified storage class.

Each reclaiming operation takes a valid directory entry in a target storage class, invalidates the entry, and makes the entry's space available to the specified storage class. Only directory entries associated with "unchanged" data items (whether or not stored in SES) are selectable for a reclaiming operation, and these directory entries are sometimes referred to as "unchanged directory entries". Each valid SES cache directory entry may have a data item stored in a SES cache. A backing copy of the same data item is stored in the sysplex DASD, which may not be the latest version of the data item; but any SES copy is the latest version.

A copy of a data item in SES or in a CPC local cache is considered "changed" or "unchanged" relative to its DASD copy; an unchanged copy in SES or a CPC has the same data as its DASD copy. Only the SES cache directory entries indicating an unchanged data item in SES are subject to reclaiming. A SES cache directory entry associated with a changed copy of a data item in SES must first have the data item castout to DASD to convert the entry from indicating a "changed" data item into indicating an "unchanged" data item, before the entry (and the data item if stored in SES) can be reclaimed.

Each reclaiming operation reclaims the current LRU (least recently used) unchanged directory entry in the target storage class, indicated in the queue header of the recency queue for each storage class. If a reclaimed directory entry has an associated data item stored in SES, the space occupied by the associated data item is released in the SES data area, which may then be overlayed by another data item currently requesting storage in SES in the specified storage class. Any excess space released by a reclaiming operation and not needed to satisfy the current need for storage space is put into a free pool of available space for use by a subsequent reclaiming operation.

Activation must be done for the reclaim controls for a specified storage class before they can perform any reclaiming operation. Activation is done by a CPC command that provides enabling or disabling target values for initializing the respective elements in the vector associated with the specified storage class. The reclaim activation command is issued separately for each specified storage class to respectively initialize its vector elements. Each issuance of the command may set up a different set of reclaim values for different target storage classes for any specified storage class.

When a vector is activated by a CPC command, its initialized reclaiming values are loaded into the corresponding counter elements to initialize the associated counter.

A predetermined disabling value (such as zero) is loaded in any vector element to disable reclaiming operations in the associated target storage class. Thus, a disabled vector element prevents its associated storage class from losing any of its current directory entries and their data items stored in SES to isolate that storage class from the reclaiming process.

An enabling value (such as a non-zero positive value) is loaded into each vector element to enable its associated storage class to operate as a target storage class. The size of the enabling value determines the number of reclaiming operations allowed by the vector element for the associated target storage class. For each reclaiming operation, the value in the associated counter element is decremented (incremented) toward the disabling value. When the decremented (incremented) value in the counter reaches the predetermined disabling value, reclaiming stops from the associated target storage class. Then, the counter element must be reloaded from the corresponding vector element if reclaiming is to continue from the associated target storage class.

The reclaiming controls for each supported storage class also include a cursor and a repeat factor. The cursor locates the current target storage class for the specified storage class. Initially, when a counter is loaded from its vector, the associated cursor is set to locate a predetermined counter element, such as at the first enabled counter element.

The reclaim operations operate independently in SES for the different specified storage classes. A reclaiming operation occurs whenever a CPC read or write command misses in the SES cache, and insufficient cache storage space exists to satisfy a request requiring a new directory entry in the SES cache or a new or increased size data element is required to be stored in the SES cache data area if insufficient space currently exists in the pool of SES free space.

Upon a demand for space by a missed request, the reclaiming controls operate automatically in SES to select the vector/counter assigned to the specified storage class in the missed command and perform the reclaiming operation(s) for releasing the required space. The current cursor setting for the selected vector/counter then selects the current target storage class for a reclaim operation, which is initiated to obtain the space needed for satisfying the missed request. Additional reclaiming operation(s) are initiated if, after the initial reclaiming operation, insufficient space still exists for satisfying the missed request for storing a data item in SES. After sufficient space is obtained to satisfy the missed request, the reclaiming controls for the specified storage class become dormant until another CPC request misses in that specified storage class and requires SES cache space.

Whenever the number of reclaiming operations causes the count for the current target storage class to reach its disabling value, the cursor value is incremented by the reclaiming controls to locate the next counter element currently having an enabling value, and space is stolen from its associated target storage class. The counter elements may be sequentially selected in a round-robin sequence, although any predetermined target sequence can be used.

When all counter elements contain, or reach, the disabling value, reclaiming stops for the specified storage class, because it no longer has any enabled target storage class. Then a value in a repeat factor element for the specified storage class is examined to determine if it is an enabling value (such as a non-zero value). If the repeat factor is enabling, it is decremented (incremented) toward its disabling value, and the elements in the associated counter for the specified storage class are again loaded with the values in the associated vector.

When the repeat factor is at, or reaches, its disabling value and all counter elements contain disabling values, no further reclaiming is done from any target storage class. This is a "default" condition for the specified storage class, in which the specified storage class may only steal storage space from its own currently-valid LRU unchanged directory entry (indicated in its recency queue header).

The invention also provides other special features for controlling the reclaiming process in SES. One feature is an ability in the CPCs to generate a running list of data items accessed in the CPC which the CPC does not want invalidated in SES by the reclaiming process. The list is generated in the CPC by adding the name of a data item to the list each time the data item is accessed in the CPC. Periodically, the CPC uses a special command to send the list to SES requiring SES to re-order its recency queues having entry representations for data items on the list to prevent any of the listed items from becoming an LRU entry, which is the only entry in any queue subject to reclaiming.

Another feature is a special CPC command requesting SES to send the CPC various types of measurement information about particular storage classes, such as how many read misses occurred in each storage class, etc. The CPC can use this information to determine new initialization values for the vectors and repeat factors of the respective storage classes, which the CPC will send to SES in a special command to cause SES to re-adjust its storage space allocations among the storage classes by means of the reclaiming operations occuring during the next measurement interval. In this manner, a CPC can control the hit or miss ratios occurring in any storage classes by re-adjusting the storage allocations over the next time interval. Increasing the size of a storage class decreases its miss ratio (and increases its hit ratio); decreasing the size of a storage class increases its miss ratio (and decreases its hit ratio).

OBJECTS OF THIS INVENTION ARE TO

1. Allocate a new cache structure in SES.
2. Change the structure of an existing SES cache.
3. Remove a cache from SES.
4. Provide any number of storage classes, which are assigned by the users of a SES cache for classifying data items in a sysplex.
5. Enable the classification of data items into classes based on differences in the performance requirements for access to those data items.
6. Enable program controlled means to balance the storage usage in a SES cache among allocated classes of data items.
7. Enable programming to balance SES storage usage among classes based on real time requirements as the demand for data items in differing classes changes over time.
8. Support CPC programming with low overhead for managing storage classes in a SES cache.
9. Enable program controlled means through which local cache reference patterns can be reflected to a SES cache for controlling storage management functions.
10. Provide mechanisms which insure continued integrity of data items contained in local processor storage caches during storage management processes performed at a SES facility.

A feature of the invention is to provide isolation of data items in a storage class in which replacement is not currently allowed to assure continued availability to attached CPCs of the data items stored in a SES cache.

Another feature is to enable the CPCs to designate storage classes that allow the CPCs to control the storage performance of a SES cache, including re-allocation of SES cache storage for directory entries and data items among plural storage classes.

Still another feature is to control access hit ratios among plural storage classes.

The invention provides a base framework for SES cache storage control in a sysplex that allows use of many different reclaiming control algorithms.

BRIEF DESCRIPTION OF THE DRAWINGS

FIG. 1 shows the reclaiming controls for a storage class.

FIG. 10 shows the format of the directory-entry information block (DEIB).

DESCRIPTION OF THE DETAILED EMBODIMENTS

Major Parts Of The Embodiments

Figure 2:
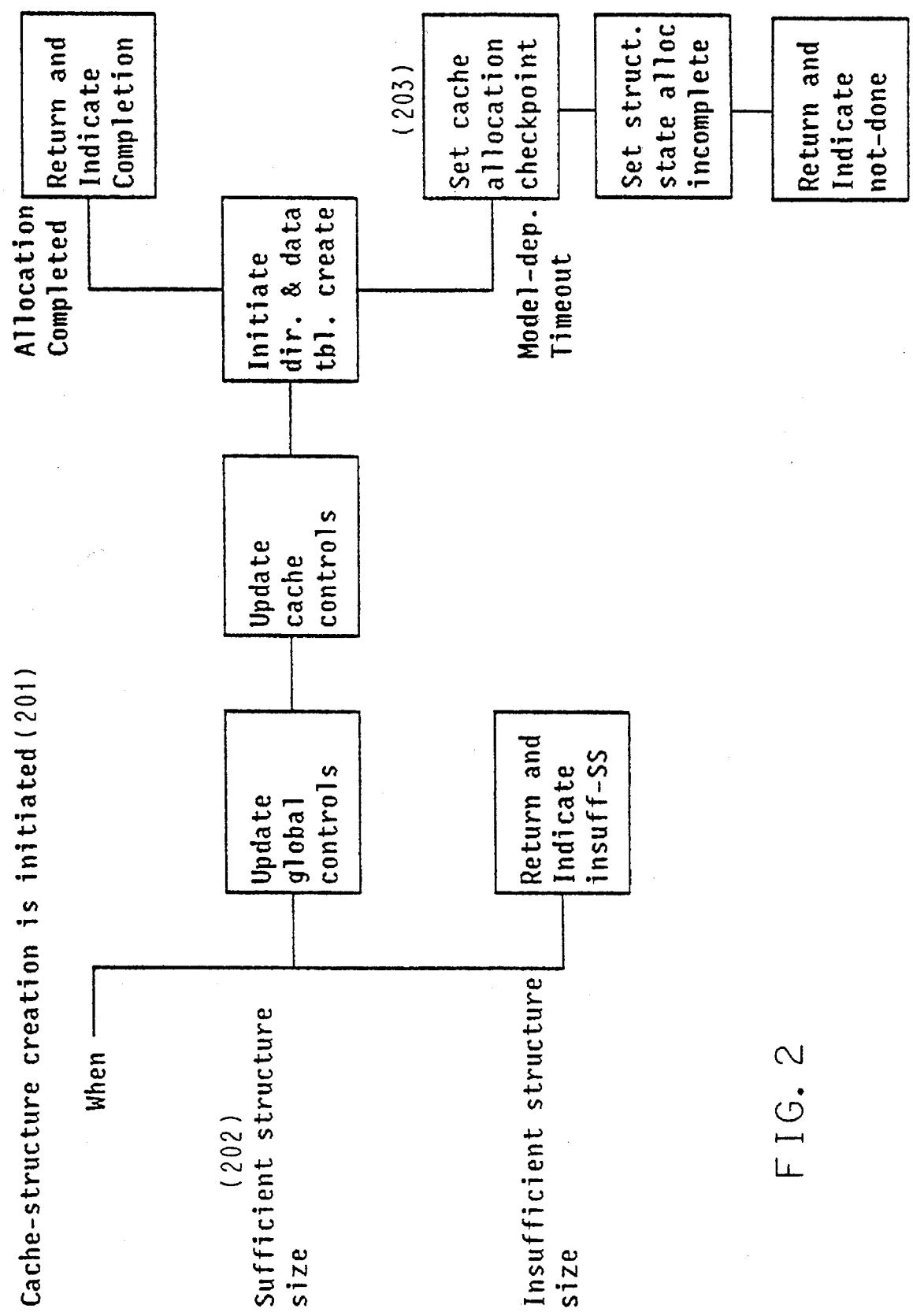
FIGS. 2 and 3 are process flow diagrams of the Allocate Cache Structure command.

The preferred embodiment comprises a plurality of CPCs containing operating systems supporting attachment to shared DASD and a shared electronic storage (SES) facility. Data is to be shared and managed on the DASD, in a cache contained in the shared electronic storage facility, and in local processor storage in the CPCs. Managing the use of storage within the shared electronic storage uses one or more processors or micro-processors, contained in SES which receive commands from the CPCs and execute programs which address the problems of: enabling classes of data items (elements) to be identified based on differences in the performance requirements for access to those data items; providing programming controlled means to balance the storage usage between storage classes of data items in real time as the demand for data items in differing classes changes over time; minimizing programming overhead associated with the management of the storage; providing program controlled means through which CPC local cache reference patterns can be reflected to the SES cache storage management functions; insuring continued integrity of data items contained in the local processor storage caches during storage management processes performed at the shared electronic storage facility.

All processes executed in SES are controlled by programs (or microprograms) executed by a SES-contained processor, or micro-processor.

A SES cache is a component of a sysplex three-level storage hierarchy. The lowest level of the hierarchy is DASD, the intermediate level is the SES-cache and the highest level is the local cache in CPC processor storage. The DASD and SES cache are shared by the CPC processors and are accessed by I/O operations and message operations, respectively. Local cache(s) may be defined in each CPC and is accessed using CPU instructions in the CPC.

Data that moves through the storage hierarchy is named. The data sizes are variable with the range of variability between 1 and N times the data-area element size. The data-area element sizes are fixed for each SES cache and are powers of 2 with a minimum size of 256 bytes. The names are 16-byte values assigned by a programming protocol. The data is permanently resident in the DASD storage.

Copies or new versions of the data may also reside in any combination of SES-cache storage or local-cache storage. In particular, a data item may reside in SES-cache storage, but not in any CPC local cache, it may reside in SES-cache storage and a subset of CPC local caches or it may reside in a subset of CPC local caches but not in the SES-cache storage.

CPC Local Cache

A local cache is defined to the SES-support facility on the CPC containing the local cache as described in U.S. patent application Ser. No. 07/860,797 (PO992004). CPU instructions initialize controls in the SES-support facility and assign a local-cache token. The sizes of the local caches may vary between systems.

SES Cache

The SES cache is a structure in SES consisting of a collection of data-area elements and a directory. It is designated by a structure identifier. The SES cache is created by an allocate-cache-structure command. The command is issued by an initialization procedure at a processor which determines the attributes of the SES cache: size and number of data-area elements, number of directory entries, number of storage classes, and number of castout classes.

A CPC local cache is attached to the SES cache by the attach-local-cache command that initializes controls in the SES facility and associates the local cache with a set of paths over which the SES cache issues generated commands to the SES-support facility. A CPC local cache is attached to a SES cache so that it may participate in the storage hierarchy. Coherency of copies of the data in the local caches and in the SES cache is maintained by controls in the SES cache and enforced by cross-invalidate commands issued as generated commands to the various SES-support facilities. The processes for cache coherency are described in U.S. patent application Ser. No. 07/860,805 (PO9-91-052).

SES-Cache Directory

The SES-cache directory is a collection of directory entries arranged as a fully associative array. The directory entries are partitioned into storage classes. The subset of changed directory entries is partitioned into castout classes. Whenever a named data object is placed in the higher two levels of the hierarchy, its state and location is registered by the SES-cache directory. State information indicates whether the data is changed, unchanged, or locked for castout. Location information includes whether the data is resident in the SES-cache storage and which local caches contain a copy. The record (located in the SES-cache data area by pointers in the directory) is herein referred to by any of several different terms: record, data element, data item, block, page, etc. Certain SES-read and SES-write commands register the local-cache copy in the SES-cache directory. SES-write and SES-invalidate commands remove the registration of local copies.

Local-Cache-Entry Valid State

When the data is located in the local cache, the state of the data is either valid or invalid. The valid state of local cache entries is maintained by controls in the SES-support facility. The data is validated by CPU instructions and is invalidated by SES-write and SES-invalidate operations. The valid state of the data is tested by a CPU instruction. A valid named data object must be registered in the SES-cache directory. Local-cache coherency is maintained by the invalidation process. The processes which use these controls to maintain coherency of data are described in U.S. patent application Ser. No. 07/860,805 (PO9-91-052).

Castout Process

The SES-cache storage is normally smaller than the DASD storage. Thus periodically the changed data must be transferred from the SES cache to the backing DASD. This process, called castout, is controlled by the program and involves the following operations:

- A SES-read for castout operation is issued that sets the castout serialization and copies the data block to main storage.
- An I/O operation is executed that copies the data block to DASD.
- A SES-unlock operation is issued that releases the castout serialization.

Related data objects are maintained in castout classes by the SES cache. Castout classes are used to improve the efficiency of the castout process by enabling the program to batch data transfers to DASD in a single I/O operation. The processes which perform the movement of data between DASD and the SES cache are described in U.S. patent application Ser. No. 07/860,806 (PO9-91-079).

Reclaiming Process

The least recently used unchanged data and directory resources are reclaimed by the SES cache when needed to meet new requests. The data objects are mapped into one of several storage classes by the program using the message control block in FIG. 1B. Each storage class has a reclaiming vector (shown in FIG. 1A) that controls the reclaiming process. This allows the allotment of SES storage among the storage classes to be dynamically adjusted to account for changes in workload characteristics. The reclaiming vector is initialized by the program. The processes which utilize these SES cache storage management objects are the subject of this disclosure.

Instrumentation

Instrumentation information is provided to the program to assist in both the allocation of data across storage classes and in the castout process.

Cache Structure Objects

A set of cache-structure objects is established for each SES-cache structure. The cache-structure objects related to this specification consist of:

- Cache controls
- Directory
- Data areas
- Storage-class controls

Cache Controls

Data-Area-Element Characteristic (DAEX):

A one-byte unsigned binary integer that specifies the number of bytes in each data-area element. The size of the data-area element in bytes is the product of 256 and 2 raised to the power of the value specified in the data-area-element characteristic. Valid sizes in bytes are 256 to the maximum data-area-element size.

Maximum Data-Area Size (MDAS):

A five-bit unsigned binary integer that specifies the maximum allowable size of a data area as an integral multiple of the data-area-element size. The maximum data-area size is set by the program when the cache is allocated.

Maximum Storage Class (MSC):

A one-byte unsigned binary integer that specifies the number of storage classes. Valid storage-class values range from one to the maximum-storage-class value.

Structure Size (SS):

A four-byte unsigned binary integer that specifies the number of 4K-byte units of SES storage allocated for the cache.

Total-Data-Area-Element Count (TDAEC):

A four-byte unsigned binary integer that specifies the number of data-area elements allocated for the cache.

Total-Directory-Entry Count (TDEC):

A 4-byte unsigned binary integer that specifies the number of directory entries allocated for the cache.

Directory:

The directory is the repository of state and location information for the SES and attached local cache(s). Each named data block that appears in the SES has an associated directory entry. The directory entries are arranged as a fully associative array and are accessed by using the value of the name field.

The directory-entry fields are summarized as follows:

Castout Lock

Change bit

Data bit

Data area size

Name

Storage class

User-data field

Castout Lock (CO):

A two-byte value which indicates the castout state of the data. When the castout lock is zero the data is not being castout. When the castout lock is not zero, the value of the first byte of the castout lock identifies the local cache that is casting out the data block from the SES cache to DASD. The value of the second byte identifies the castout process on the local system. When the castout lock is not zero, the data bit must be one. See patent application Ser. No. 07/860,806 (PO9-91-079).

Change Bit (C):

A one-bit value which, in conjunction with the castout lock, indicates the changed state of the data. When the change bit is one, the data is cached as changed. When the change bit is zero and the data is not locked for castout, the data is either not cached, or is cached but not changed. When the change bit is zero and the data is locked for castout, the data is cached as changed. Whenever the data is in the changed state, the most recent version of the data resides in the cache. When the change bit is one, the data bit must also be one.

Data Bit (D):

A one-bit value which indicates whether the data is located in the SES cache. When the data bit is one, the data is cached. When the data bit is zero, the data is not cached.

Data-Area Size (DAS):

A five-bit unsigned binary integer that specifies the size of the data area as an integral multiple of the data-area-element size. The initial value is zero when the directory entry is assigned and is zero until the data bit is set to one.

Name (N):

The name contains a 16-byte value specified by the program when the named data object is registered in the cache.

Storage Class (STC):

A one-byte value which identifies the storage class assigned for the name.

User-Data Field (UDF):

The user-data field contains an eight-byte value that is associated with the data when it is initially changed in the SES cache and is maintained until the data-table entry is reused. The user-data field is valid when the data is cached as changed.

Data Area:

The data area is a storage object containing the contents of a single named data object. A data area is associated with a directory entry when the named data object is initially written into the cache and remains associated until either a reclaim operation occurs or the name is invalidated. The data area consists of from one to N data-area elements. The data area size is determined when the named data object is written.

Storage-Class Controls:

The storage-class controls consist of:

Storage-class queue

Reclaiming controls

Storage-class counters

Storage-Class Queue (SCQ):

An ordered list of the directory entries in the storage class. The queue is ordered in reference order; the most recently referenced directory elements are at the bottom of the queue and the oldest, or least recently referenced, are at the top of the queue. A storage-class queue exists for each storage class in the cache.

Reclaiming Controls:

A reclaiming vector 102, a set of reclaiming counters 103, a reclaiming vector cursor not shown, and a repeat factor 101 are associated with each storage class. Collectively, they are referred to as the reclaiming controls for the storage class and are shown in FIG. 1A. The reclaiming controls are as follows:

Reclaiming Counters (RCT) (103):

An array of two-byte counters associated with each storage class and a cursor addressing a single array element. The values of the reclaiming counters are initialized to the values in the reclaiming vector when a set-reclaiming-vector command is processed or when the repeat factor is decremented to a nonzero value.

When a reclaiming operation is performed, the cursor identifies the target storage class where the reclaiming operation is performed, provided the reclaiming vector is active.

Reclaiming Vector (RV) (102):

An array of two-byte counters associated with each storage class. A reclaiming-vector entry (RVE) exists for each storage class defined in the cache and is indexed by storage-class value. The array is initialized by the set-reclaiming-vector command.

Repeat Factor (RF) (101):

A two-byte unsigned binary integer that specifies the number of times the reclaiming counts are initialized with the values in the reclaiming vector. The repeat factor is set to a program-specified value by the set-reclaiming-vector command. When the repeat factor is zero, the reclaiming vector is inactive.

The repeat factor allows for large changes to be made in the storage-class sizes by trimming small portions from each storage class in a round-robin fashion. This distributes and minimizes the disruptive impacts the changes have on overall performance.

Alternative design may provide a single reclaim vector for the cache, as opposed to a reclaim vector per storage class. While a single reclaim vector effectively reduces the size of a set of storage classes, it is less effective in controlling the reapportionment of the reclaimed storage. Storage classes with a short interval of high write activity occurring immediately after the reclaim vector is activated will obtain a disproportionate share of the storage. A reclaim vector per storage class allows the program to cap the amount of storage that a particular storage class will receive. Thus, while a single reclaim vector effectively controls storage-class size reduction, a reclaim vector per storage class, controls both the reduction and expansion of storage-class size.

Storage-Class Counters

A set of instrumentation counters is maintained for each storage class. The counters are 32-bit unsigned binary integers. They are initialized to zero when the cache is allocated and are incremented for each occurrence of the event defined for the counter. The storage-class counters are summarized in the following:

Castout Counter (COC):

A castout operation was performed for the storage class.

Completed-Reference-List Counter (CRLC):

Processing of a reference list had been completed by initiating a reference signal for each name that is in the name list and is assigned to the directory.

Data-Area Counter (DAC):

The number of data areas assigned to the storage class.

Data-Area-Element Counter (DAEC):

The number of data-area elements assigned to the storage class.

Data-Area-Reclaim Counter (DARC):

A data-area-assignment operation for the storage class required that a data area be reclaimed, and the reclaim operation was successful.

Directory-Entry Counter (DEC):

The number of directory entries assigned to the storage class.

Directory-Entry-Reclaim Counter (DERC):

A name-assignment operation for the storage class required that a directory entry be reclaimed, and the reclaim operation was successful.

Partially-Completed-Reference-List Counter (PCRLC):

Processing of a reference list was abandoned due to the expiration of a model-dependent timeout.

Read-Hit Counter (RHC):

Data was returned for a read-and-register command.

Read-Miss-Assignment-Suppressed Counter (RMASC):

A read-and-register command specified a name which was not assigned in the directory, and name assignment was suppressed for the command.

Read-Miss-Directory-Hit Counter (RMDHC):

A read-and-register command specified an assigned name in the directory for which the data was not cached.

Read-Miss-Name-Assigned Counter (RMNAC):

A read-and-register command specified a name which was not assigned in the directory, and a directory entry was successfully assigned to the name.

Read-Miss-Target-Storage-Class-Full Counter (RMTSFC):

A read-and-register command specified a name which was not assigned in the directory, and a name-assignment could not be completed for the specified storage class due to a lack of storage resources in the target storage class.

Reference-Signal-Miss Counter (RSMC):

A name was processed for the process-reference-list command which was not found in the directory.

Target-Storage-Class-Full Counter (TSCFC):

A directory-entry assignment or data-table-entry assignment could not be completed when the storage class was selected as the target storage class.

Total Changed Count (TCC):

The number of directory entries in the storage class that are in the changed state; i.e. either the change bit is set or the castout lock is set to a nonzero value. The count is returned on a write-when-registered or write-and-register command when a change signal is processed as well as on a read-storage-class-information command.

Write-Hit-Change-Bit-0 Counter (WHCB0C):

A write-and-register or write-when register command completed by storing the data with the change bit set to zero.

Write-Hit-Change-Bit-1 Counter (WHCB1C):

A write-and-register or write-when register command completed by storing the data with the change bit set to one.

Write-Miss-Invalid-State Counter (WMISC):

A write-and-register or write-when-register command specified a change-bit value of zero when the data was cached as changed.

Write-Miss-Not-Registered Counter (WMNRC):

A write-when-registered command could not be completed; the specified local-cache-entry was not listed in the user register.

Write-Miss-Target-Storage-Class-Full
Counter (WMTSLFC):

A write-and-register or write-when-registered command could not be completed for the source storage class due to a lack of storage resources in the target storage class.

XI-for-Complement-Invalidation Counter (XICIC):

A cross-invalidate (XI) signal was issued to satisfy an invalidate-complement-copies command.

XI-for-Directory-Reclaim Counter (XIFDRC):

A cross-invalidate (XI) signal was issued to satisfy a directory-entry-reclaim operation.

XI-for-Name-Invalidation Counter (XINIC):

A cross-invalidate (XI) signal was issued to satisfy an invalidate-name command.

XI-for-Write Counter (XIFWC):

A cross-invalidate (XI) signal was issued to satisfy a a write-when-registered or write-and-register command.

Cache-Structure Operands

The cache-structure operands related to SES storage management are summarized in the following:

Change Control (CHGC):

The change control is a one-bit value that selects which process is used for writing the data. The two possible values are:

0 Write data unchanged
1 Write data changed

Data-Area Size (DAS):

A five-bit binary value that specifies the size of the data area as an integral multiple of the data-area-element size. Valid values range from 0 to the maximum data-area size.

Data-Block Size (DBS):

A five-bit binary value that specifies the size of the data block as an integral multiple of 4096-byte units.

Target Directory-to-Data Ratio (TDTDR):

A two-byte field consisting of two one-byte unsigned binary integers that specify the relative number of directory entries to data-area elements. The integer specified in the first byte divided by the sum of the two numbers represents the fraction of the total count of directory and data-area elements that consists of directory entries. The integer specified by the second byte divided by the sum of the two numbers represents the fraction of the total count consisting of data-area elements.

Maximum Data-Area Size (MDAS):

A five-bit binary value that specifies the maximum allowable size of a data area as an integral multiple of the data-area-element size.

Maximum Storage Class (MSC):

A one-byte unsigned binary integer that specifies the number of storage classes.

Name (N):

A 16-byte value that identifies a data block in the storage hierarchy.

Name Mask (NM):

A two-byte value that determines the bytes used for name comparison.

Reclaiming Vector (RV):

A 64-entry array of two-byte counters associated with each storage class (see FIG. 1A).

Repeat Factor (RF):

A two-byte unsigned binary integer that specifies the number of times the reclaiming counts are initialized with the values in the reclaiming vector.

Storage Class (STC):

A one-byte value that identifies a storage class.

Structure Size (SS):

A four-byte value that specifies the number of 4096-byte units of SES storage allocated for the cache structure.

Target Storage Class (TSTC):

A one-byte value that identifies the target storage class when a reclaim operation has failed due to a full condition.

Total Changed Count (TCC):

A four-byte unsigned binary integer that indicates the number of directory entries in the storage class that are in the changed state; i.e. either the change bit is set, or the castout lock is set to a nonzero value.

User-Data Field (UDF):

An eight-byte field associated with a cached data block.

Cache-Structure Processes

The following processes are invoked by various cache-structure commands. The set of processes invoked by a command are listed in the command description.

Allocating a Cache Structure:

A cache structure is created on the first successful invocation of the allocate-cache-structure command for a structure that does not already exist. A cache structure is initially allocated after one or more successful invocations of the allocate-cache-structure command. These operations are referred to generically as cache-allocation processes.

An allocate-cache-structure command is successful when response code 0 or 1 is returned.

Checkpointing a Cache-Allocation Process:

After a cache structure is created, an allocate-cache-structure command is always checkpointed when a response code of 0 or 1 is returned. After a cache structure is created, an allocation process may be checkpointed anytime during the execution of a successful allocate-cache-structure command or when background processing continues as a result of a successful allocate-cache-structure command. Background processing of a successful allocate-cache-structure command stops when a response code of zero is returned.

When a cache-allocation process is checkpointed the structure-size, total-directory-entry-count, and total-data-area-element-count cache objects are updated, and the free-space and free-control-space global objects are updated.

Completing a Cache-Allocation Process:

When a response code of zero is returned, all requested cache-allocation processes are complete.

Creating a Cache Structure:

When the cache structure is created, the target directory-to-data ratio and the adjunct-assignment indicator determine the attributes of the created structure. When the second byte of the target directory-to-data ratio is zero, no data area elements or adjunct area elements are created and the cache is a directory-only cache. When the second byte of the target directory-to-data ratio is nonzero and the adjunct-assignment indicator is one, an adjunct area is assigned to the directory entry when data is initially cached in the data area.

When the second byte of the target-directory-to-data ratio is nonzero and the adjunct-assignment indicator is zero, no adjunct areas are created.

When a cache-structure is created;

(1) the created bit in the structure-identifier vector associated with the SID value is set to one, and (2) the cache-structure controls are initialized.

This includes the following:

Initializing the LCID vector to zero.

Placing the USC operand in the user-structure control,

Setting the adjunct-assignment indicator equal to the value of the AAI operand,

Placing the DAEX operand in the data-area element-characteristic object,

Placing the MDAS operand in the maximum-data-area size object,

Updating the structure-size

When a cache structure is created, (1) the structure-size object is initialized to the largest storage size available that is equal to or smaller than the target-structure-size request operand, (2) the ratio of the new total-directory-entry-count object to the total-data-area-element-count object is within the range of zero to the directory to data ratio.

Data-Area-Element Assignment:

Data-area-element assignment is processed for the specified name, storage class, and data-area size by obtaining an ordered collection of available data-area elements, attaching them to the directory entry, setting the data bit to one, and setting the data-area-size object to the value of the DAS operand. When insufficient data-area elements are available, data areas are reclaimed to satisfy the request. Each reclaimed data area is cleared, the data-area elements are attached to the directory entry, and any remaining data-area elements are placed on the free list of data-area elements.

For each reclaim operation, the oldest data area cached as unchanged is reclaimed from the target storage class. The count of data-area reclaims (DARC) is incremented. When the target storage class is full of changed directory entries or directory entries with the data bit set to zero, no candidates are available for selection. In this case, the data-area-element assignment is completed with a target-storage-class-full condition, counter TSCFC is incremented for the target storage class, and all assigned or successfully reclaimed data-area elements are returned to the free list.

Directory and Data-Area Element Creation:

The available storage assigned to the cache structure is apportioned to create directory entries and data-area elements. The number of each that is created is a function of the amount of available storage, the specified directory-to-data ratio, the data-area-element characteristic, and the specified structure size. The resulting number of directory entries and data-area elements are placed in the total-directory-entry-count (TDEC) and total-data-area-element-count (TDAEC) control fields, respectively.

Once the total-directory-entry count is established, the total storage e available for the creation of data-area elements is determined by subtracting the directory storage. The storage required for data-area elements is determined by the data-area-element characteristic and the directory-to-data ratio.

Figure 17:
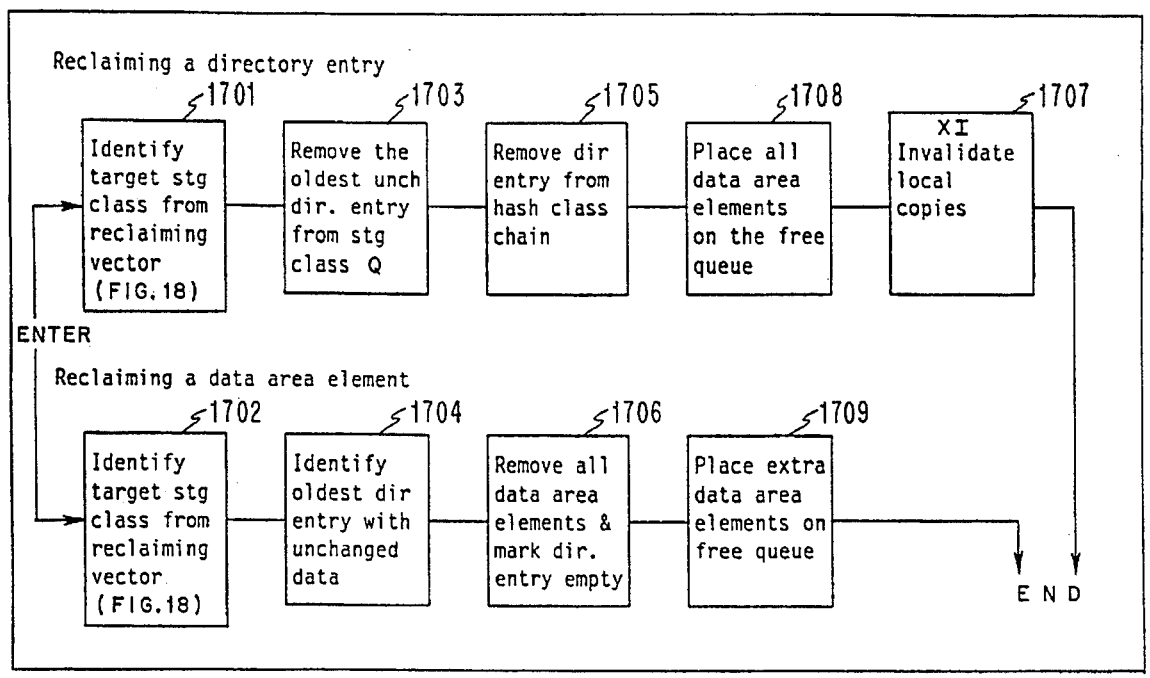
FIG. 17 is a process flow diagram for the directory and data area reclaiming process.

Directory and Data-Area Reclaiming:

FIG. 17 is a process flow diagram for the directory and data area reclaiming process. Data-areas and directory entries are reclaimed for a specified storage class. The reclaiming process involves identifying a target storage class (1701 and 1702), locating the oldest unchanged directory entry (1703) or data-area (1704) in the target class, and detaching the directory entry or data-table entry from the directory (1705 and 1706).

When a directory entry is detached from the directory, the directory entry is marked invalid. The local-cache register is scanned, a cross-invalidate signal is issued for each valid entry, and the entry is invalidated (1707).

When a directory entry with an assigned data area is reclaimed, the data area is released and the data-area elements are placed on the free list (1708).

Figure 18:
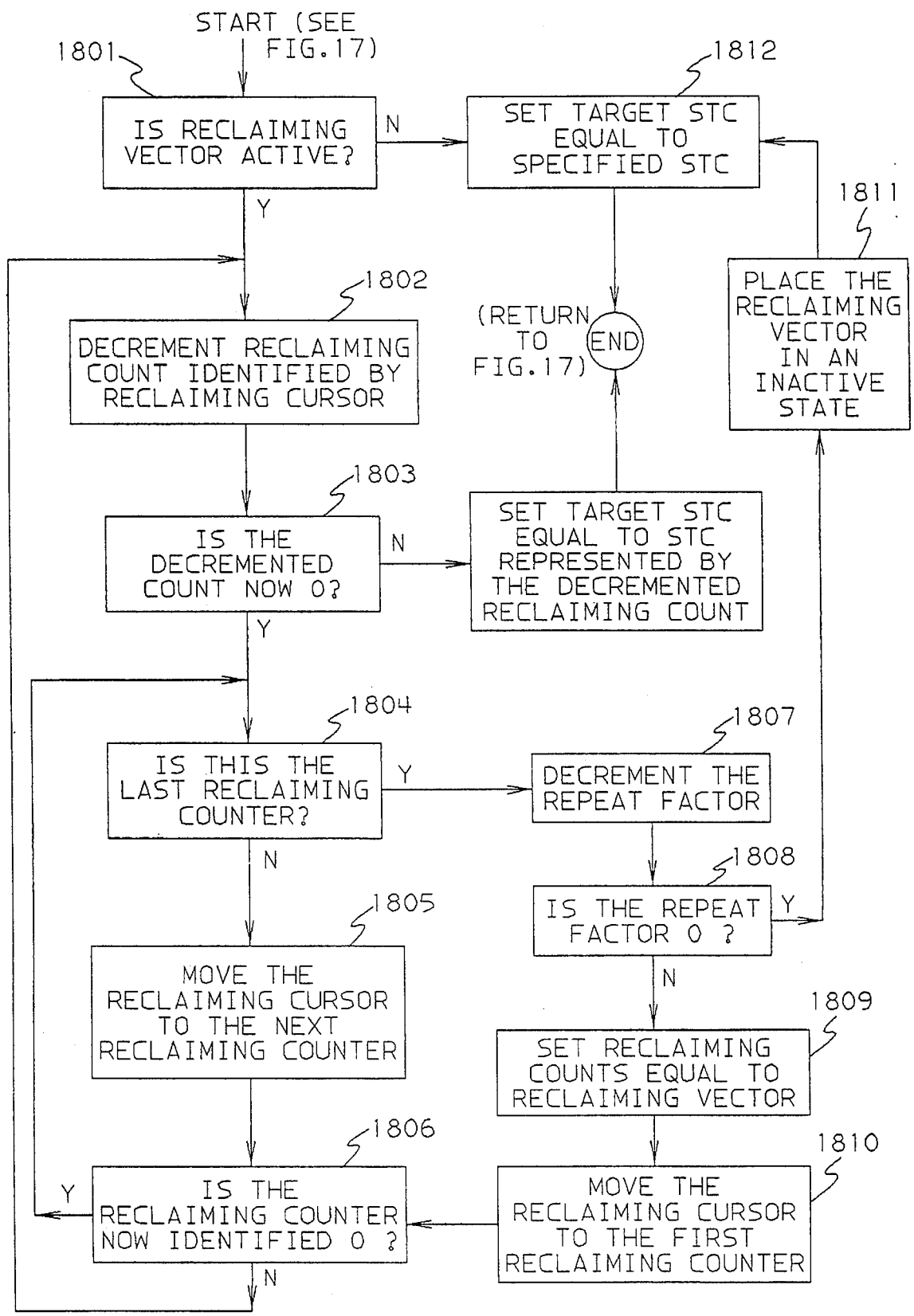
FIG. 18 is a process flow diagram representing the operation of the reclaiming vector and the reclaiming counters in the preferred embodiment for dynamically controlling the allocation of directory and data area space among the storage classes currently in a SES cache.

The target storage class is identified by the reclaiming-vector cursor when the reclaiming vector is active. FIG. 18 is a flow diagram for target storage class identification. When referenced, the reclaiming vector is updated as follows:

The reclaiming count for the current array element is decremented (1802).

When the count reaches zero (Y path from 1803) the reclaiming-vector cursor is moved to the next array element (1805) with a nonzero reclaiming count (N path from 1806).

When the reclaiming-vector cursor points to the last array element in the vector and the count in this element is zero (Y path from 1804), the repeat factor is decremented (1807), the reclaiming counts are refreshed to their initial values (1809) and the cursor is moved to the array element which has the smallest index (1810) and contains a nonzero count (N path from 1806).

When the repeat factor reaches zero (Y path from 1808), the reclaiming vector is placed in the inactive state (1811); otherwise, the reclaiming vector remains active.

When the reclaiming vector for the specified storage class is inactive (N path from 1801), the specified storage class is the default target class (1812).

SES cache storage management processes uphold the data integrity maintained through processes described in previously cited patent application Ser. No. 07/860,805 (PO9-91-052). Issuing cross-invalidate signals when a directory entry is reclaimed prevents the following from occurring:

1. The directory entry with name X is reclaimed. Local copies remain valid, but their registration is no longer tracked by SES.

2. The name X is registered in a different directory entry and changed. Since the valid local copies are not registered in the new directory entry, no XI signals are issued, and the local buffers lose coherency.

Name Assignment:

A name assignment is processed for the specified name and storage class by obtaining an invalid directory entry, marking it valid, initializing the name, and attaching the directory entry to the directory. The count of directory entries in the storage class (DEC) is incremented.

When no invalid directory entries are available, a valid directory entry is reclaimed, cleared of its current contents, and attached to the directory.

The oldest unchanged directory entry is reclaimed from the target storage class. The count of directory-entry reclaims (DERC) is incremented. If the directory entry is reclaimed from a different storage class, the count of directory entries for the target storage class is decremented, and the count of directory entries for specified storage class is incremented. If the reclaim operation adds one or more data-area elements to the free list, the count of the data-area elements (DAEC) for the target storage class is decreased by the number of reclaimed data-area elements. The directory entry reclaim may result in cross-invalidate signals. The number of cross-invalidate signals issued is added to the count of cross-invalidate (XI) signals for directory reclaim (XIFDRC).

When the target storage class is full of changed directory entries, no candidates are available for selection. In this case, the name assignment is completed with a target-storage-class-full condition, and counter TSCFC is incremented for the target storage class.

Storage-Class Removal:

A storage-class-removal process is made for a specified directory entry. The processing is as follows:

The directory entry is removed from the storage-class queue.

The count of directory entries (DEC) is decremented.

When data is cached in the directory entry, the count of the data-area elements (DAEC) for the storage class is decreased by the value of the data-area size.

When data is cached as changed in the directory entry, the total changed count (TCC) is decremented.

Reference-Signal Processing:

A reference signal is processed for a specified name and storage class. The storage class is stored in the directory entry and the directory entry is added to the bottom of the storage-class queue. This may be the initial placement in a storage class, may represent a change of storage-class specification, or may be a reference to the data within the storage class.

When the storage class is changed, a storage-class removal process is executed for the storage class originally specified in the directory entry, and the counters are updated in the new storage class. The count of directory entries (DEC) is incremented. When data is cached in the directory entry, the count of data-area elements (DAEC) is increased by the value of the data-area size. When data is cached as changed, the total changed count (TCC) is incremented.

Figure 3:
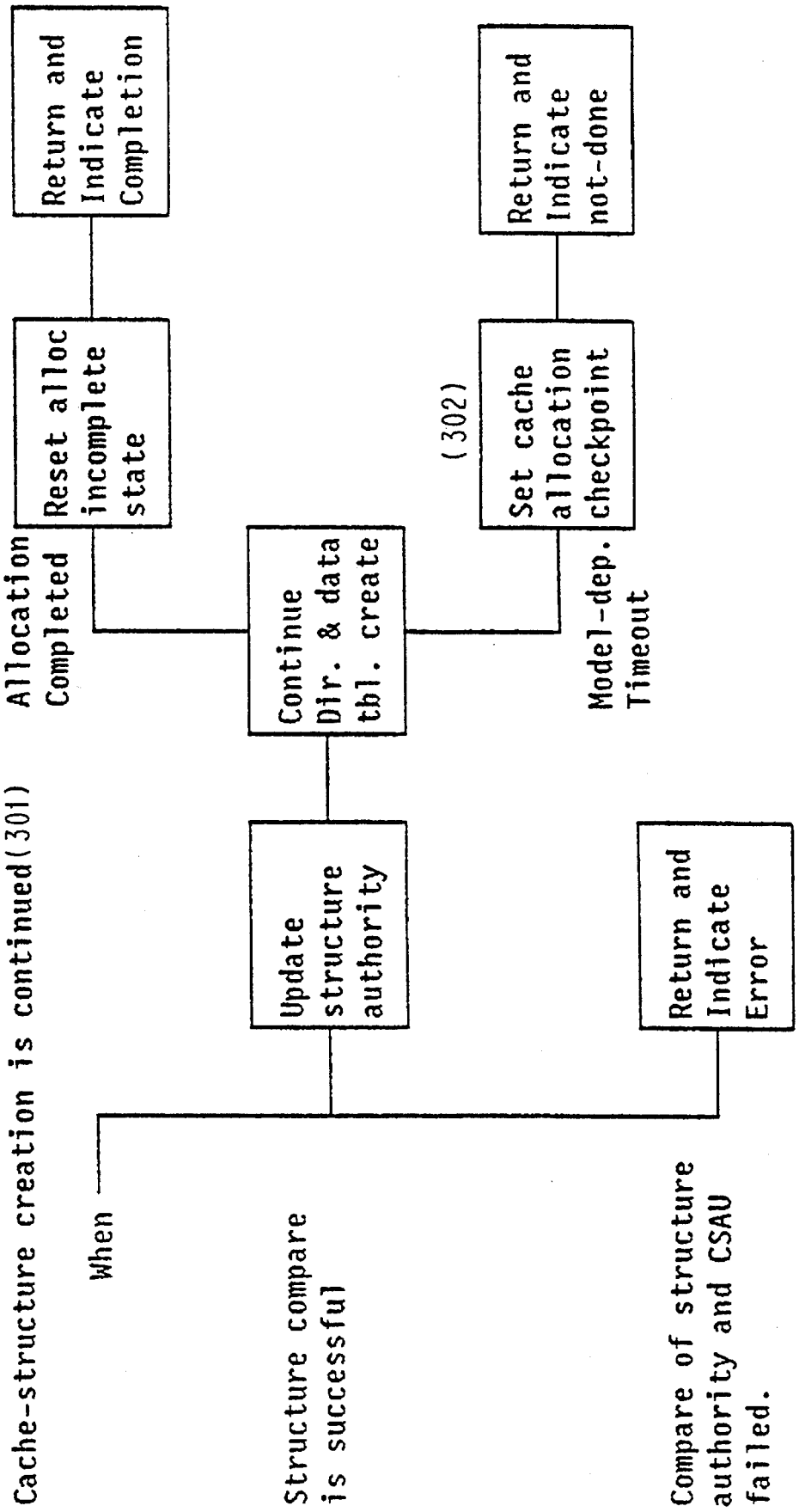

Cache-Structure Commands:

The following commands are described in reference to actions taken at the SES and against SES objects as shown in the process flow diagrams for:

Allocate Cache Structure—FIGS. 2 and 3

Figure 4:
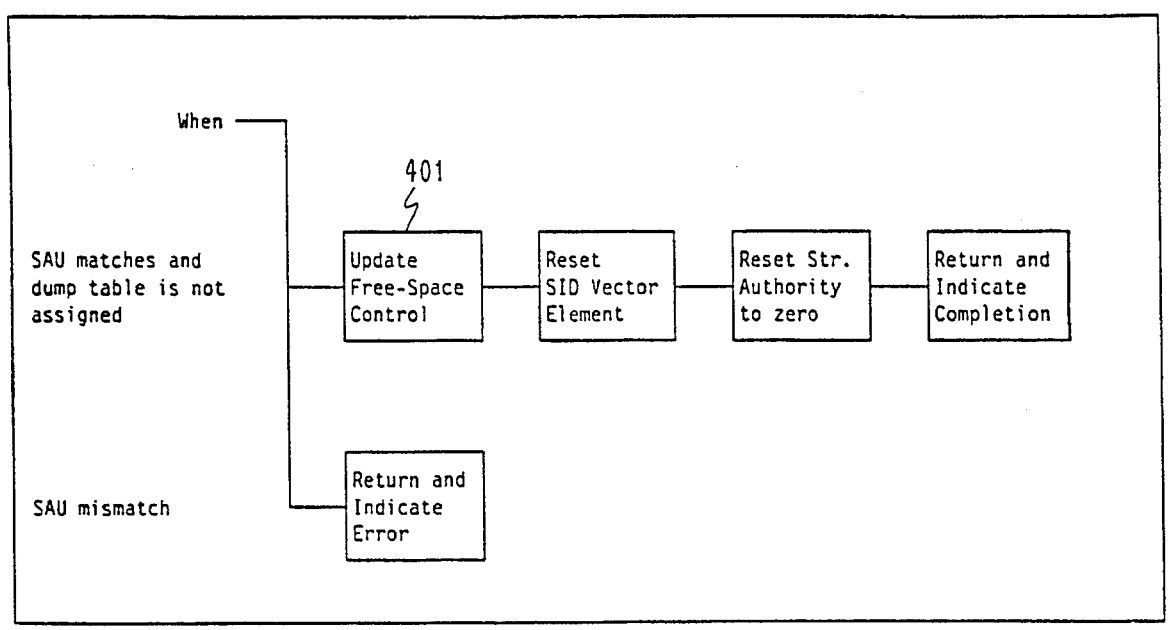
FIG. 4 is a process flow diagram of the Deallocate Cache Structure command.

Deallocate Cache Structure—FIG. 4

Figure 5:
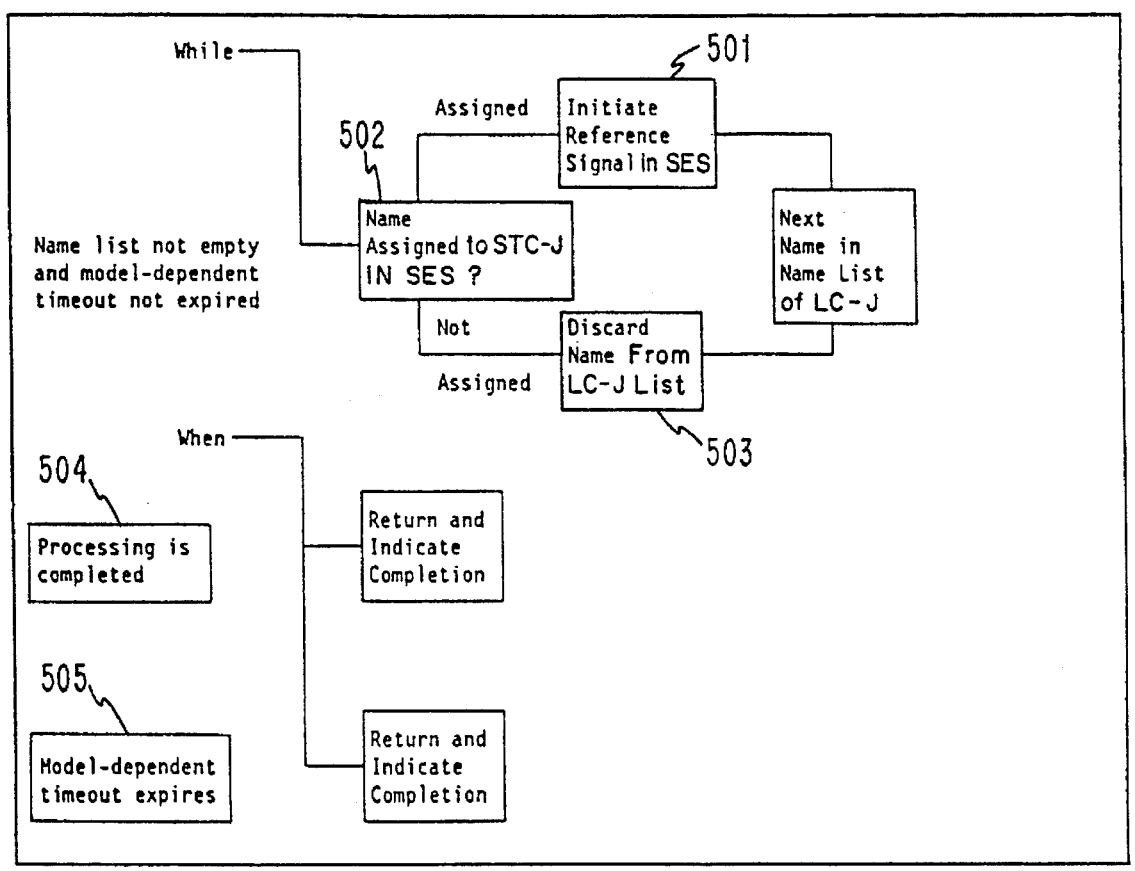
FIG. 5 is a process flow diagram of the Process Reference List command.

Process Reference List—FIG. 5

Figure 7:
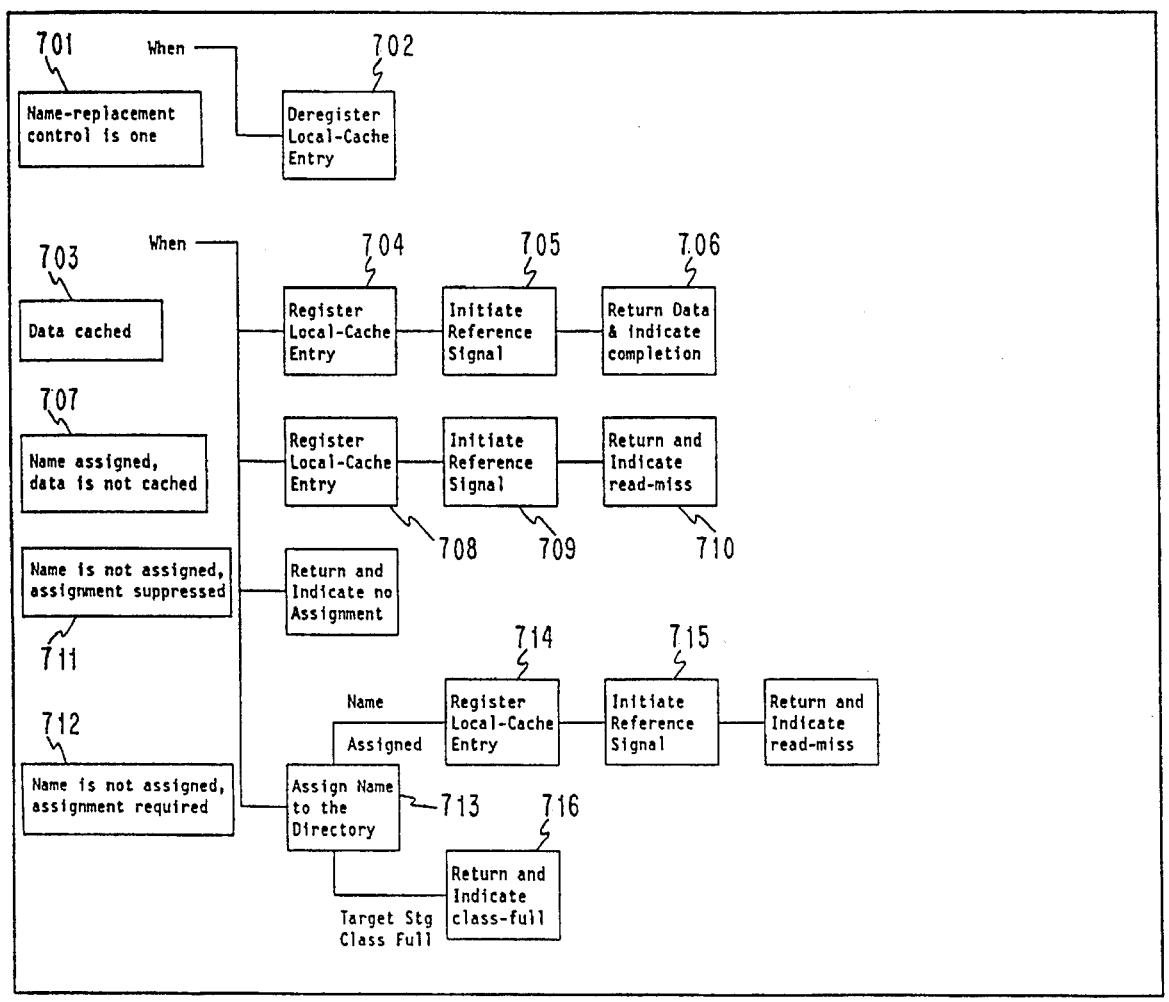
FIG. 7 is a process flow diagram of the Read and Register command.

Read and Register—FIG. 7

Figure 9:
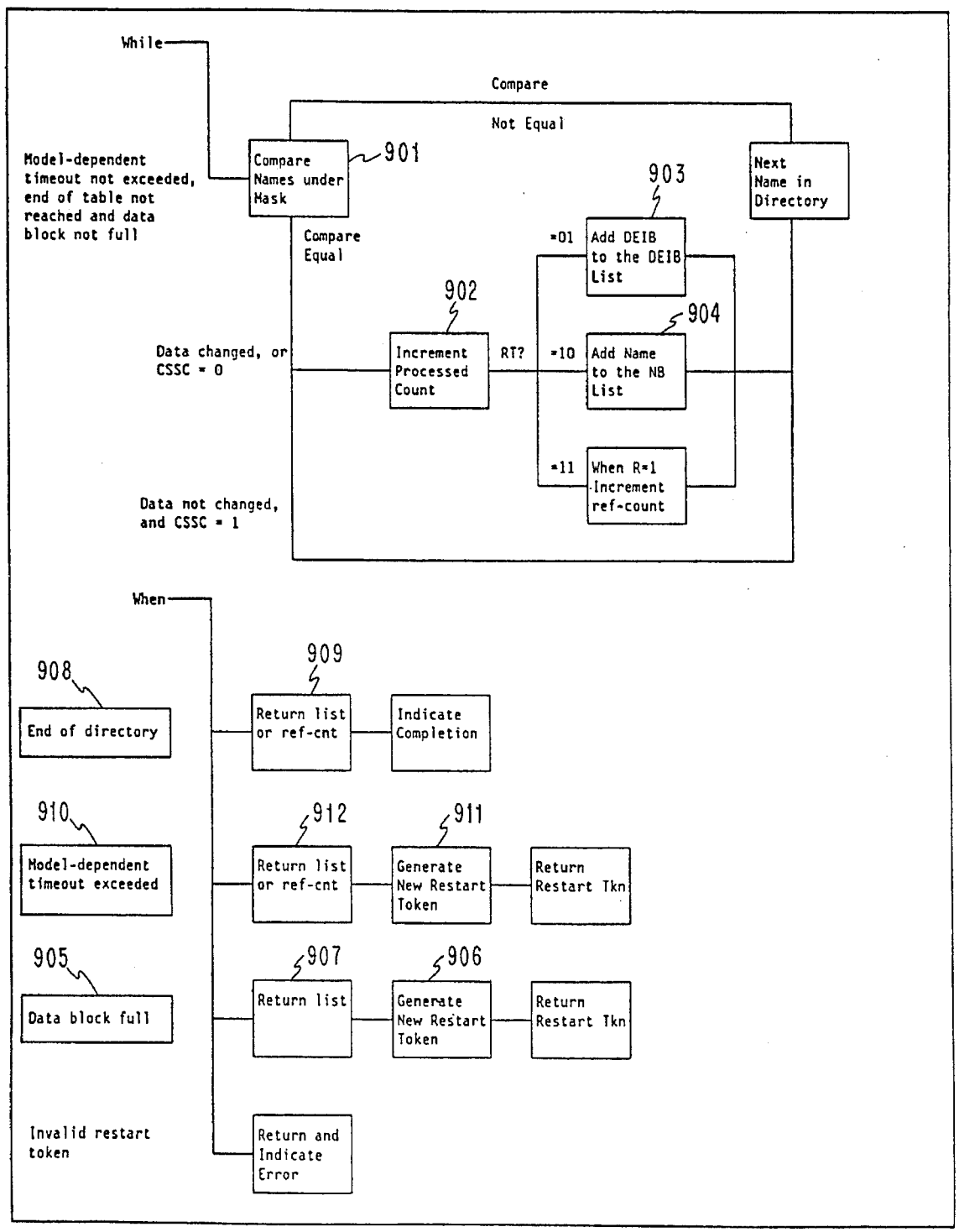
FIG. 9 represents the processes invoked by the Read Directory command.

Read Directory—FIG. 9

Figure 11:
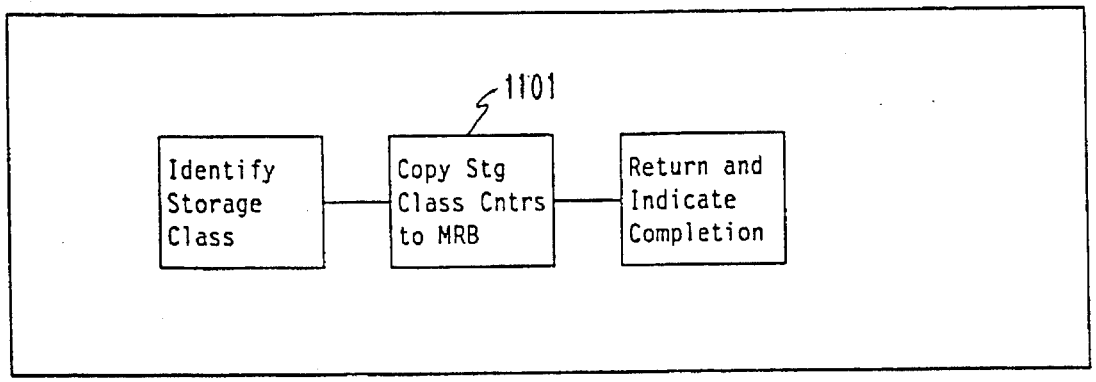
FIG. 11 is a process flow diagram of the Read Storage-Class Information command.

Read Storage-Class Information—FIG. 11

Figure 12:
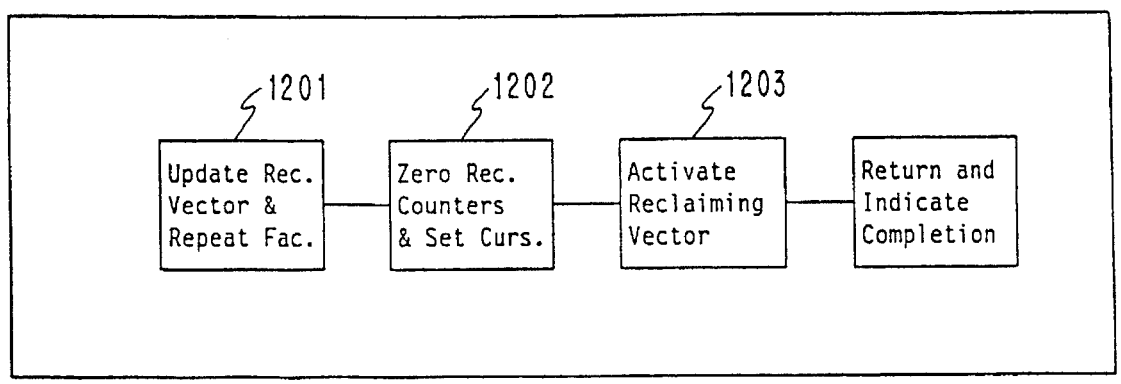
FIG. 12 is a process flow diagram of the Set Reclaiming Vector command.

Set Reclaiming Vector—FIG. 12

Figure 13:
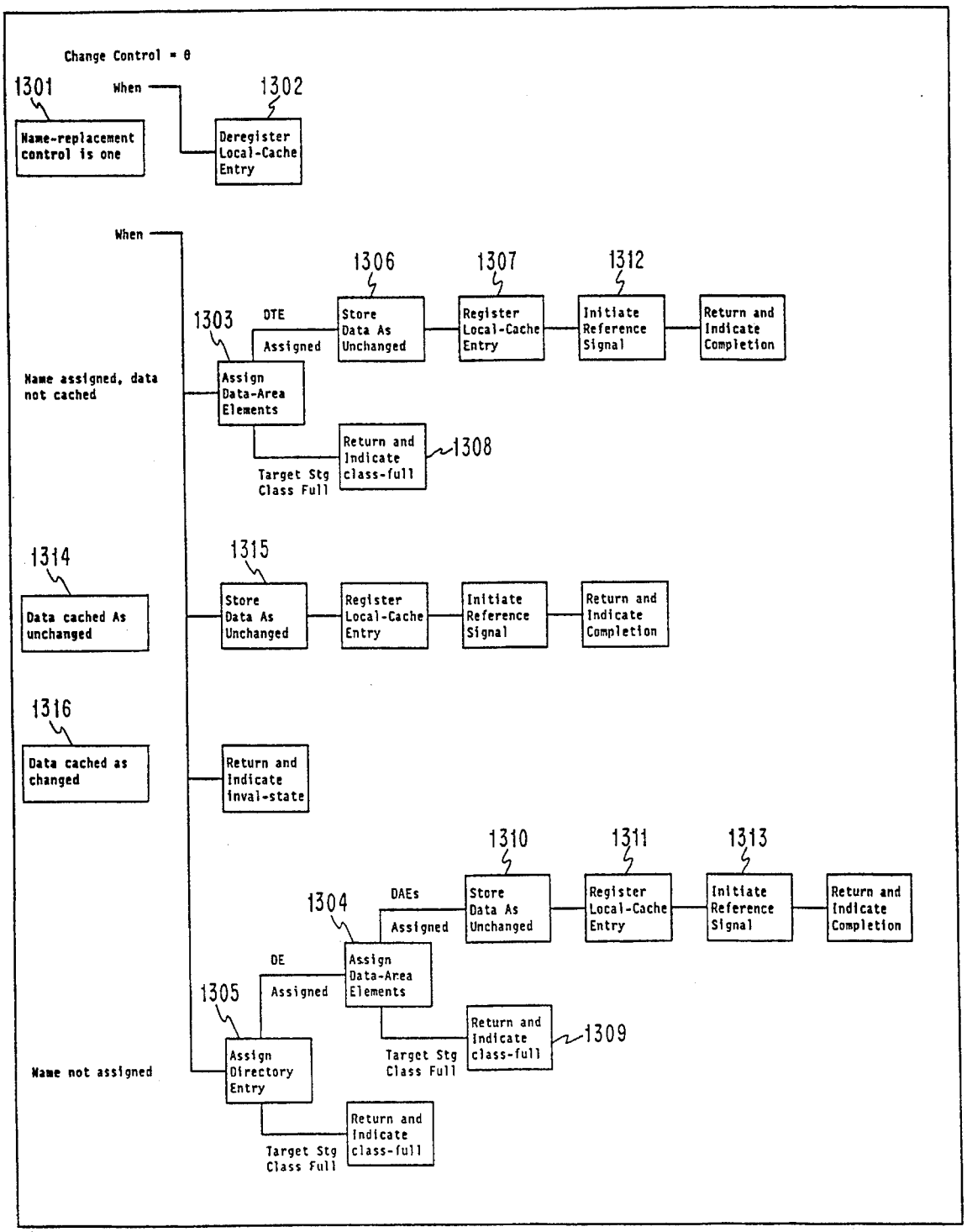
FIGS. 13 and 14 are process flow diagrams of the Write and Register command.
Figure 14:
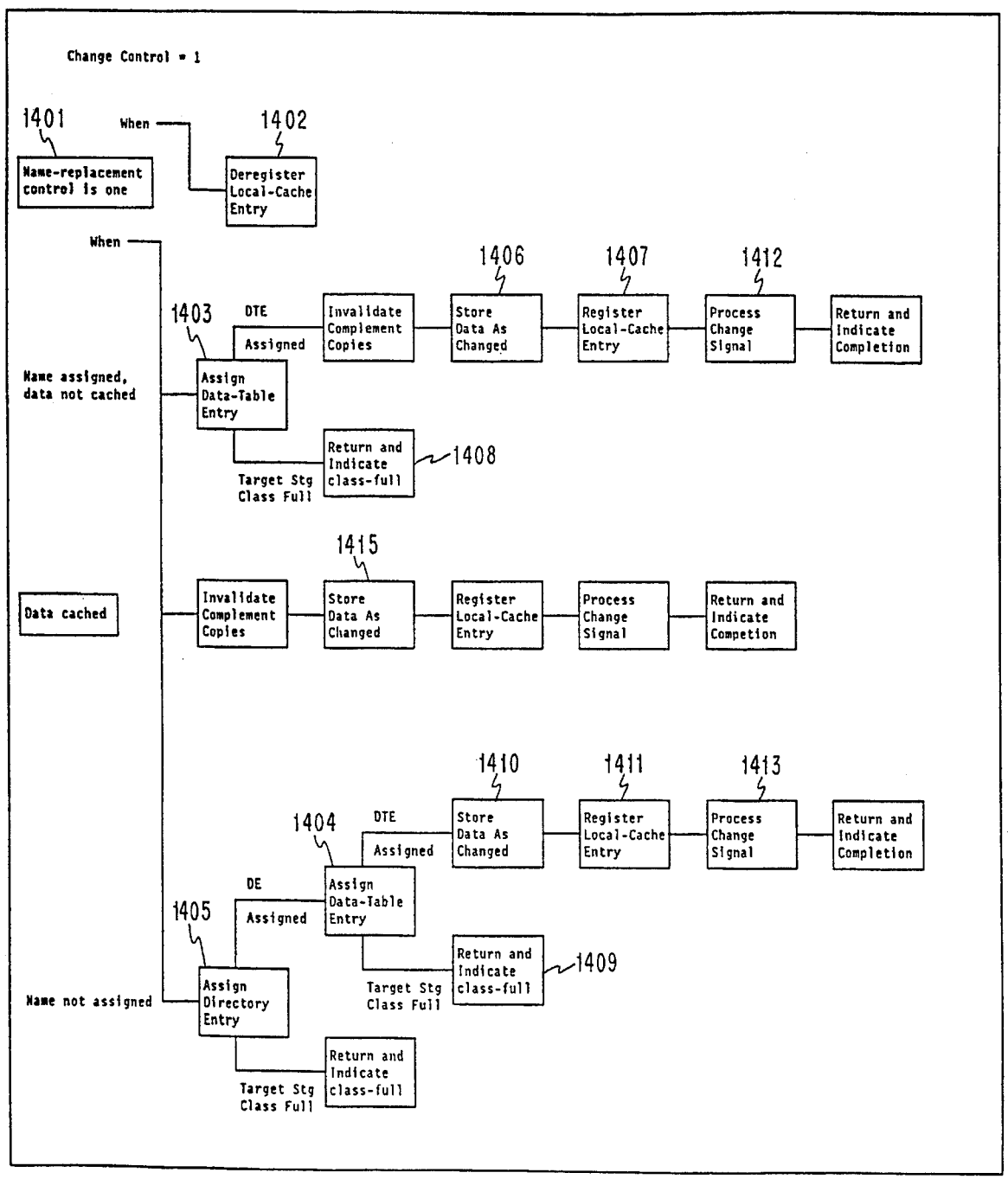

Write and Register—FIGS. 13 and 14

Figure 15:
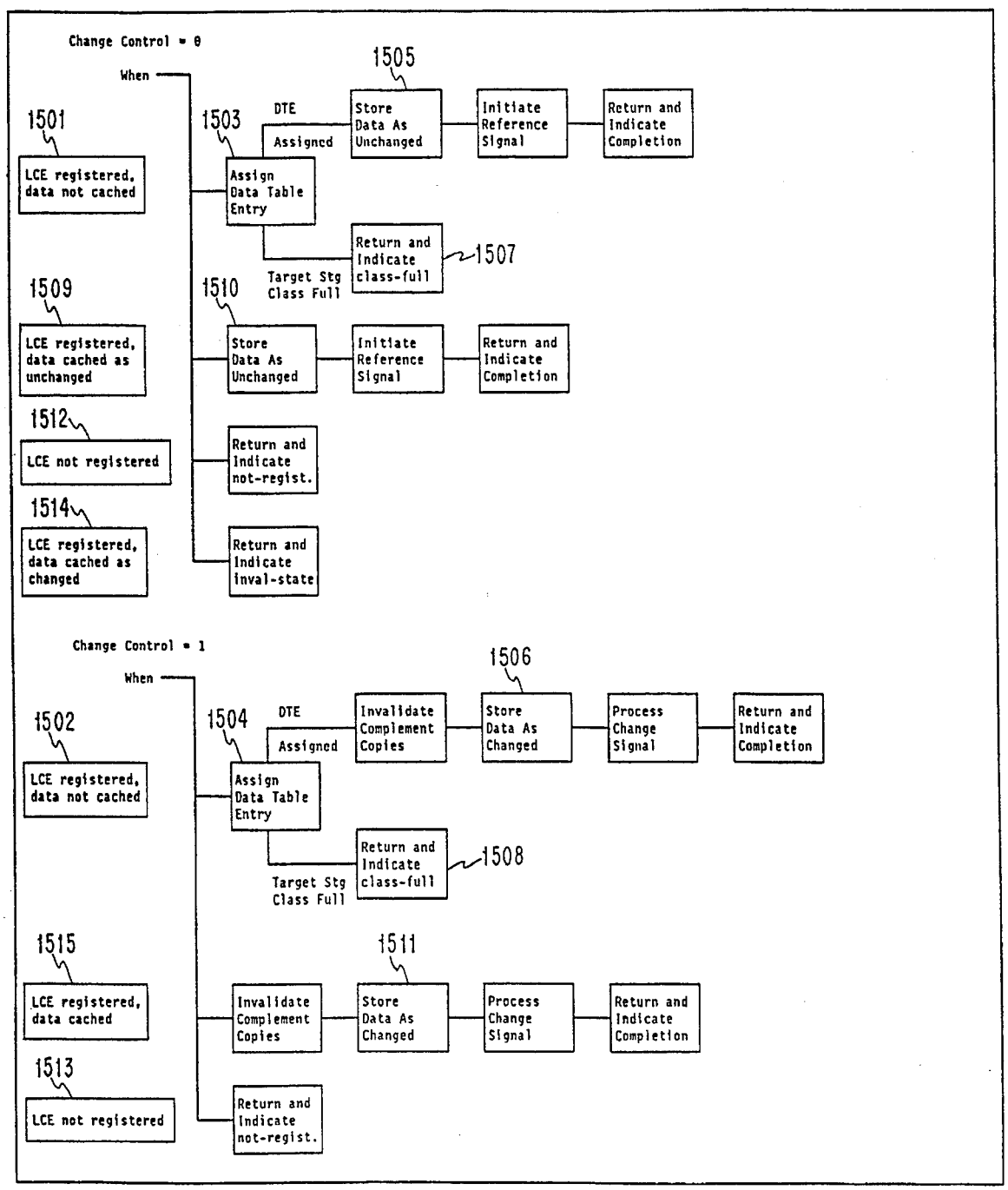
FIG. 15 is a process flow diagram of the Write When Registered command.

Write When Registered—FIG. 15

Allocate Cache Structure:

FIGS. 2 and 3 are process flow diagrams of the Allocate Cache Structure command. The allocate-cache-structure command creates the storage resources for a cache structure.

The allocate-cache-structure command updates the user structure control with the value of the user-structure-control request operand when:

(1) a cache structure is created (201)

The allocate-cache-structure command creates a cache structure (204) when:

(1) the specified created bit of the structure-identifier vector is zero, and (2) the structure size is sufficient for creating at least one directory entry and associated controls. (202)

The allocate-cache-structure command continues the initial allocation of a cache structure (301) when:

(1) the specified created bit of the structure-identifier vector is one, and (2) initial allocation of the structure has not completed.

The cache-structure processes are checkpointed and completed at the established checkpoint (203) (302) when:

(1) initial allocation of the structure has completed.

When all the requested cache-structure processes are complete, the processes are checkpointed and the total-directory-entry count, total-data-area-element count, structure size, free space global control, and a completion response code are returned to the program. (209)

When a model-dependent time period has elapsed before the allocation processes are completed, the processes are checkpointed and the total-directory-entry count, total-data-area-element count, structure size, free control space global control, and an exception response code are returned to the program. (211)

When the structure size specified is insufficient to allow for the creation of at least one directory entry and the associated controls, the minimum structure size required to support the request is placed in the structure-size response operand. The structure-size response operand and an exception response code are returned to the program. (213)

Deallocate Cache Structure:

FIG. 4 is a process flow diagram of the Deallocate Cache Structure command. The deallocate-cache-structure command deletes the specified cache structure. This includes freeing the storage, updating the free-space (401), and the free-control-space global controls.

Process Reference List:

FIG. 5 is a process flow diagram of the Process Reference List command. A reference signal is initiated (501) for each name in the name list which is also assigned to the storage class specified by the STC request operand (502) and which is registered for the local cache specified in the request operand. When the name is not assigned to the specified storage class, the name is discarded from the list (503), and the count of missed reference signals (RSMC) is incremented for the storage class specified in the STC request operand. When the name is assigned but not registered for the local cache, the name is discarded from the name list, and the count of missed reference signals (RSMC) is incremented for the storage class specified in the directory entry. When all reference signals have been initiated (504), the count of completed reference lists (CRLC) is incremented for the storage class.

When a model-dependent time period expires before processing of the reference list has completed (505), the remaining portion of the list is not processed and the count of partially completed reference lists (PCRLC) is incremented for the storage class.

The process-reference-list command is used to propagate local-cache references to the storage-class queues. This orders the storage classes across both local-cache and SES-cache reference activity and prevents the reclaiming of directory entries and data-table entries with high local-cache activity. The program builds the name list, adding a name whenever a local-cache entry test as valid, and periodically writes the name list to the SES cache with the process-reference-list command.

Read and Register:

FIG. 7 is a process flow diagram of the Read and Register command. The read-and-register command returns the contents of a named data area to the local cache and registers the local-cache entry. When the data is not cached, only the registration operation is performed. The read-and-register command also assigns the name to the directory when the name is not currently assigned.

When the name-replacement-control request operand (NRC) is one (701), the local-cache entry designated by the replacement-name and local-cache-identifier request operands is deregistered (702). When the name-replacement control is zero, no deregistration is performed.

When the data is cached (703), the local-cache entry is registered (704), a reference signal is initiated for the storage class (705), and the data along with the change bit is returned (706). A read-hit event is counted by incrementing the RHC counter for the storage class specified in the STC operand.

When the name is assigned to the directory but the data is not cached (707), the local-cache entry is registered (708) and a reference signal is initiated for the storage class (709). A read-miss-directory-hit event is counted by incrementing the RMDHC counter for the storage class specified in the STC operand.

When the name is not assigned to the directory and directory assignment is not suppressed (712), a directory-entry-assignment operation is performed (713). If the cache is not full, a directory entry is assigned, the local-cache entry is registered (714), a reference signal is initiated for the storage class (715), and a read-miss-name-assigned event is counted by incrementing the RMNAC counter for the storage class specified in the STC operand. If the target storage class is full (716), the command is completed with an exception response code, a read-miss-target-storage-class-full event is counted by incrementing the RMTSFC counter for the storage class specified in the STC operand, and the target storage class is placed in the TSTC operand.

When the name is not listed in the directory and assignment is suppressed (711), the command is completed and an exception response code is returned. A read-miss-assignment-suppressed event is counted by incrementing the RMASC counter for the storage class specified in the STC operand.

Read misses are partitioned into four events:

Read miss, directory hit (RMDHC)

Read miss with name assignment suppressed (RMASC)

Read miss with successful name assignment (RMNAC)

Read miss with target storage class full (RMTSFC)

Figure 8:
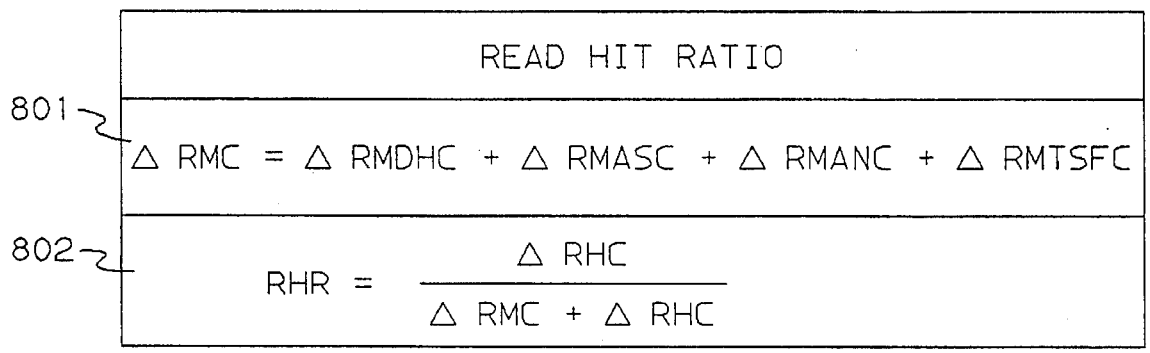
FIG. 8 enables the computation of a read-hit ratio (RHR) over a time interval.

The total number of read-miss events (RMC) in a time interval can be determined by adding together the delta changes in each of the four counters, where the delta changes in each counter are obtained by recording the value of each counter at the beginning and end of the time interval and computing the difference (FIG. 8 at 801). Thus, the read-hit ratio (RHR) over a time interval can be computed as in FIG. 8 at 802.

Read Directory:

The processes invoked by the Read Directory command are summarized in FIG. 9. The read-directory command scans the directory performing one of three requested functions; returns a list of directory-entry-information blocks, returns a list of name blocks, or resets reference bits and returns the processed and referenced counts. Directory entries are processed when the name field matches the input name under the mask condition and the changed state matches the requested state (901). The name comparison is successful when all the unmasked bytes are equal (902). A zero mask causes all names to be processed.

When the change-state-selection control is zero, all directory entries which match the name under the mask condition are processed. When the change-state-selection control is one, only entries which are changed or locked for castout and match the name under the mask condition are processed.

The directory is scanned. A directory-entry information block is added to the list of directory blocks to be returned (NB) (903 and 904) and the processed count (PC) is increased by one when the name in the directory entry matches the input name under the mask condition, and the changed state of the data matches the change-state-selection criteria.

The directory scan is controlled by the restart-token request operand. A token value of zero starts the processing, and a nonzero token value restarts the processing from the place designated by the token. Processing is completed when the data block is full, when the entire directory has been processed, or when a model-dependent timeout has been exceeded. When the data block is full (905), a restart token is generated (906) and returned along with the list of directory blocks to be returned (907), and the processed count. When the end of the directory is reached (908), the list of directory blocks to be returned (909), and the processed count are returned to the program. When a model-dependent timeout occurs before the end of the directory is reached (910), a restart token is generated and returned (911) along with the list of directory blocks to be returned (912), and the processed count.

The format of the directory-entry information block (DEIB) is shown in FIG. 10.

Scanning a directory may require multiple executions of the read-directory command. The directory may change during the scanning process. The set of directory entries that must be processed before the scanning is complete consists of the valid directory entries that exist at the initiation of directory-scan processing and remain valid. Directory entries that are added or deleted after the scanning is initiated do not need to be processed. A directory entry need only be processed once. Any directory entries updated after they are processed do not need to be processed a second time.

Read Storage-Class Information:

FIG. 11 is a process flow diagram of the Read Storage-Class Information command. The read-storage-class-information command returns statistics for a specified storage class. The counters for the specified storage class are returned. The program can calculate the rates at which given events occur by periodically retrieving the counters and determining the delta change in value for each counter from the previous retrieval. The program retrieves the counters by issuing a read-storage-class-information command. The program must handle the case when the counters wrap.

Set Reclaiming Vector:

FIG. 12 is a process flow diagram of the Set Reclaiming Vector command. The set-reclaiming-vector command initializes and activates the reclaiming vector for a storage class. The reclaiming controls of the specified storage class are updated (1201). The reclaiming-vector-entry values are placed in the reclaiming vector and the corresponding reclaiming counters (1202), the repeat-factor value is stored, the cursor position is set to the lowest index value with a nonzero reclaiming counter, and the reclaiming vector is activated (1203).

Reclaiming from a storage class is avoided by specifying a zero count in the array position corresponding to that storage class in each reclaiming vector.

Issuing a set-reclaiming-vector command while the reclaiming vector is active causes the old counts to be discarded and the new counts to take effect immediately. The command overrides the current state of the reclaiming vector.

Issuing a set-reclaiming-vector command with a repeat-factor value of zero or with all storage-class counts equal to zero causes the reclaiming vector to be deactivated. Thus an active reclaiming vector can be deactivated by program action.

It is not a requirement that the program provide a reclaiming vector for a storage class. If no reclaiming vector is provided, the reclaiming vector remains in its initial inactive state. The target storage class always is the specified storage class. If all storage classes have inactive reclaiming vectors and the free lists are empty, the cache is in a default steal algorithm called :hp1.steal in place:ehp1., where new resource assignments are satisfied by resources reclaimed strictly within the storage class.

If the cache is allocated with a single storage class, then the reclaiming algorithm and the steal-in-place algorithm are identical.

Write and Register:

FIGS. 13 and 14 are process flow diagrams of the Write and Register command. The write-and-register command stores the contents of the data block in the data area and registers the local-cache entry when the change control is compatible with the change state of the data.

The write-and-register command also assigns a directory entry whenever the name is not currently assigned to the directory.

When the name-replacement-control request operand (NRC) is one (1301 and 1401), the local-cache entry designated by the replacement-name and local-cache-identifier request operands is deregistered (1302 and 1402). When the name-replacement control is zero, no deregistration is performed.

When the data is not cached, a data-table entry is assigned (1303, 1304, 1403, and 1404). The name may or may not be assigned to the directory. If not, then a name assignment is also made (1305 and 1405). If the assignments are successful, the data is written to the SES cache unchanged when the change control is zero (1306 and 1310) and is written changed when the change control is one (1406 and 1410), and the local-cache entry is registered (1307, 1311, 1407, 1411). A reference signal is initiated to maintain the LRU queues for the storage class (1312, 1313, 1412, and 1413). If the change bit is zero, a write-hit-change-bit-0 event is counted by incrementing WHCB0C, and if the change bit is one, a write-hit-change-bit-1 event is counted by incrementing WHCB1C. Both counters are for the storage class specified in the STC operand. If the target storage class is full, the command is completed with an exception response code (1308, 1309, 1408, and 1409), the value of the target storage class is placed in the TSTC response operand, and a write-miss-target-storage-class-full event is counted by incrementing the WMTSFC counter for the storage class specified in the STC operand.

When the data is already cached as unchanged (1314), the data is written unchanged if the the change control is zero (1315), and the data is written changed if the change control is one (1415). If the change bit is zero, a write-hit-change-bit-0 event is counted by incrementing WHCB0C, and if the change bit is one, a write-hit-change-bit-1 event is counted by incrementing WHCB1C. Both counters are for the storage class specified in the STC operand.

When the data is already cached as changed and the change control is zero (1316), the data is not written, and the local-cache entry is not registered. The change control is incompatible with the change state of the data. The command is completed, an exception response code is returned, and a write-miss-invalid-state event is counted by incrementing the WMISC counter for the storage class specified in the STC operand.

When the data is cached as changed and the change control is one (1415), the data is written changed, and a write-hit-change-bit-1 event is counted by incrementing the WHCB1C counter for the storage class specified in the STC operand.

Write When Registered:

FIG. 15 is a process flow diagram of the Write When Registered command. The write-when-registered command stores the contents of the data block in the data area, provided the name is assigned in the directory, the local-cache entry is registered, and the change control is compatible with the change state of the data.

When the local-cache entry is registered and the data is not cached (1501 and 1502), a data-table entry is assigned (1503 and 1504). If the assignment is successful and the change control is zero (1505), the data is written unchanged, and a write-hit-change-bit-0 event is counted by incrementing the WHCB0C counter for the storage class specified in the STC operand. If the assignment is successful and the change control is one (1506), the data is written changed, and a write-hit-change-bit-1 event is counted by incrementing the WHCB1C counter for the storage class specified in the STC operand. If the target storage class is full (1507 and 1508), the command is completed with an exception responde code, a write-miss-target-storage-class-full event is counted by incrementing the WMTSFC counter for the storage class specified in the STC operand, and the target storage class is placed in the TSTC operand.

When the local-cache entry is registered and the data is already cached as unchanged (1509), the data is written unchanged when the change control is zero (1510), and the data is written changed when the change control is one (1511). If the change bit is zero, a write-hit-change-bit-0 event is counted by incrementing WHCB0C, and if the change bit is one, a write-hit-change-bit-1 event is counted by incrementing WHCB1C.

When the local-cache entry is not registered (1512 and 1513), the command is completed, an exception response code is returned, and a write-miss-not-registered event is counted by incrementing the WMNRC counter for the storage class specified in the STC operand.

When the local-cache entry is registered, the data is already cached as changed, and the change control is zero (1513), the data is not written. The change control is incompatible with the change state of the data. The command is completed, an exception response code is returned, and a write-miss-invalid-state event is counted by incrementing the WMISC counter for the storage class specified in the STC operand.

When the local-cache entry is registered, the data is cached as changed, and the change control is one (1515), the data is written changed (1511), and a write-hit-change-bit-1 event is counted by incrementing the WHCB1C counter for the storage class specified in the STC operand.

Write hits are partitioned into two events:

Write hit with change bit 0 (WHCB0C)

Write hit with change bit 1 (WHCB1C)

Write misses are partitioned into three events:

Write miss, LCEN not registered (WMNRC)

Write miss, data cached in invalid state (WMISC)

Write miss, target storage class full (WMTSFC)

The total number of write hits (WHC) and the total number of write misses (WMC) in a time interval can be determined by adding together the delta changes in the counters. Thus, the write-hit ratio (WHR) over a time interval can be computed as in FIG. 16 at 1601.

Management of SES Cache Storage:

The facilities described above provide the base on which management of SES cache storage is performed by system software. Protocols for managing the SES cache storage differ between data management products which exploit a SES cache. In the following, scenarios are given which exemplify use of the base facilities. Algorithms which balance storage use between storage classes can be very complex. Simplified examples will be given to demonstrate the capabilities of the base facilities to allot SES resources to storage classes to achieve storage isolation goals and to achieve cache hit ratios.

Figure 6A:
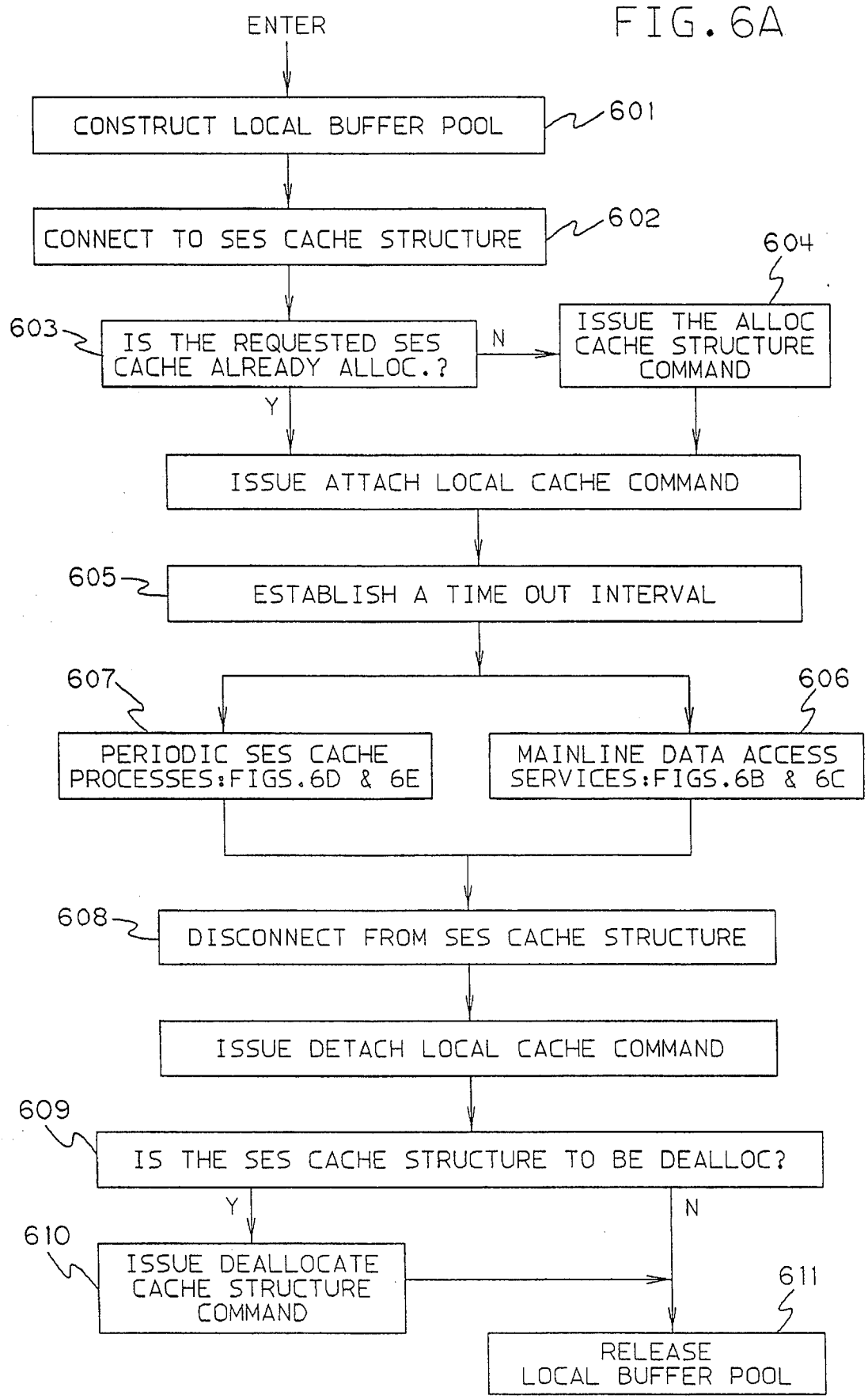
FIG. 6A is a flow diagram of the overall processing of a data base manager.

An overview of the system structure comprised of a SES cache, local data managers utilizing a SES cache, and operating system support is given in FIGS. 6A, 6B, 6C 6D, and 6E. In FIG. 6A, processing performed by the buffer manager of the data base manager is summarized. When a data base to be shared among systems in a sysplex is initially accessed, a local buffer pool may be constructed (601), operating system services which provide support for the SES cache structure may be invoked to authorize the buffer manager to access the SES cache structure (602), and a time out interval may be set using operating system services (605).

Operating system services which support a SES cache structure are invoked (602) to authorize the buffer manager to access the SES cache structure. These services first determine if the SES cache structure requested has already been allocated (603). If the SES structure has not already been allocated, the Allocate Cache Structure command is invoked to cause the SES cache structure to be created (604).

Figure 6B:
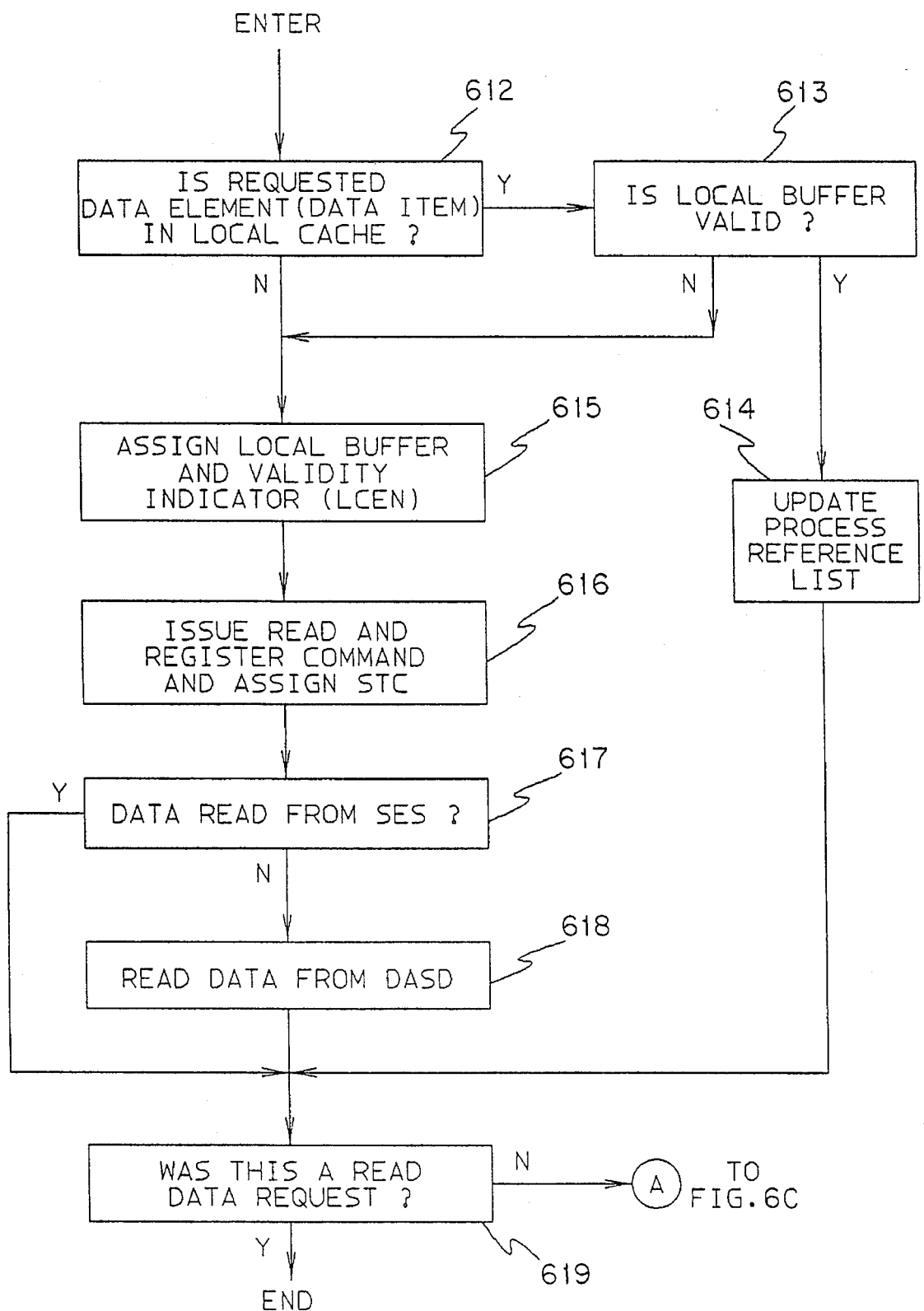
FIG. 6B is an overview of a mainline read operation.
Figure 6C:
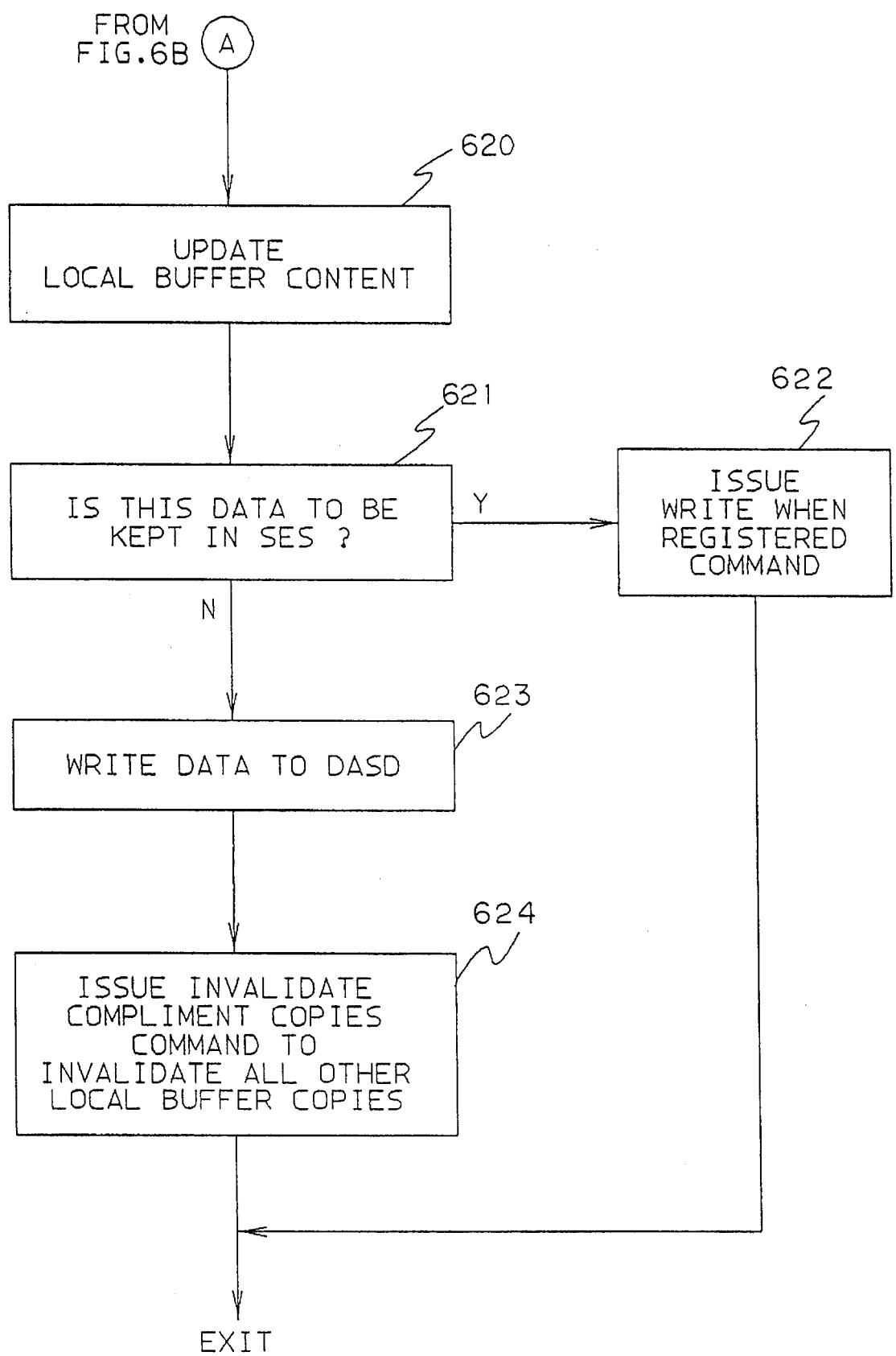
FIG. 6C is an overview of a mainline write operation.

During mainline operation, access to the data base is supported by the buffer manager. Many different protocols may be followed. An example of mainline usage is shown in FIG. 6B and 6C (detail of 606).

Data may be retrieved from DASD
Stored in the SES cache
Retrieved from the SES cache
Stored to DASD Access to data is dictated by programs which execute on the CPC and make requests of the data base manager. For example, such programs may execute as the result of requests from end users which cause transaction programs to be executed.

When a request is made of the data base buffer manager, the buffer manager determines if the requested data is already in a local buffer (612). If the data is in a local buffer, the validity of the data is checked (613). Data in a local buffer may become invalid due to updates performed by other instances of the data base manager (FIG. 6C at 622 and 624). If the data is valid in the local buffer, an entry is made in the name list used to update the SES data element references via the process reference list command (614).

If the data is not currently valid in the a local buffer, a buffer is assigned and a validity indicator is assigned (615). The read and register command is issued to register the local buffer with the SES cache and to retrieve the data if the data is stored in the SES cache (616). If the data is not retrieved from the SES cache (test made at 617), the data is read from DASD (618). A read request completes by returning the requested data to the caller.

For an update request, the buffer manager causes the local buffer content to be updated (620). A determination is then made as to whether or not the data is to be stored in the SES cache (621). If the data is to be stored in the SES cache, the write when registered command is issued (622). As part of the processing performed by the write when registered command, all other copies of the data element in local buffers of other instances of the data base manager are made invalid. If the data is not to be stored in the SES cache, the data may be written to DASD (623). When the data has been written to DASD, the invalidate complement copies command is issued to cause all other copies of the data element in local buffers of other instances of the data base manager to be made invalid (624).

Figure 6D:
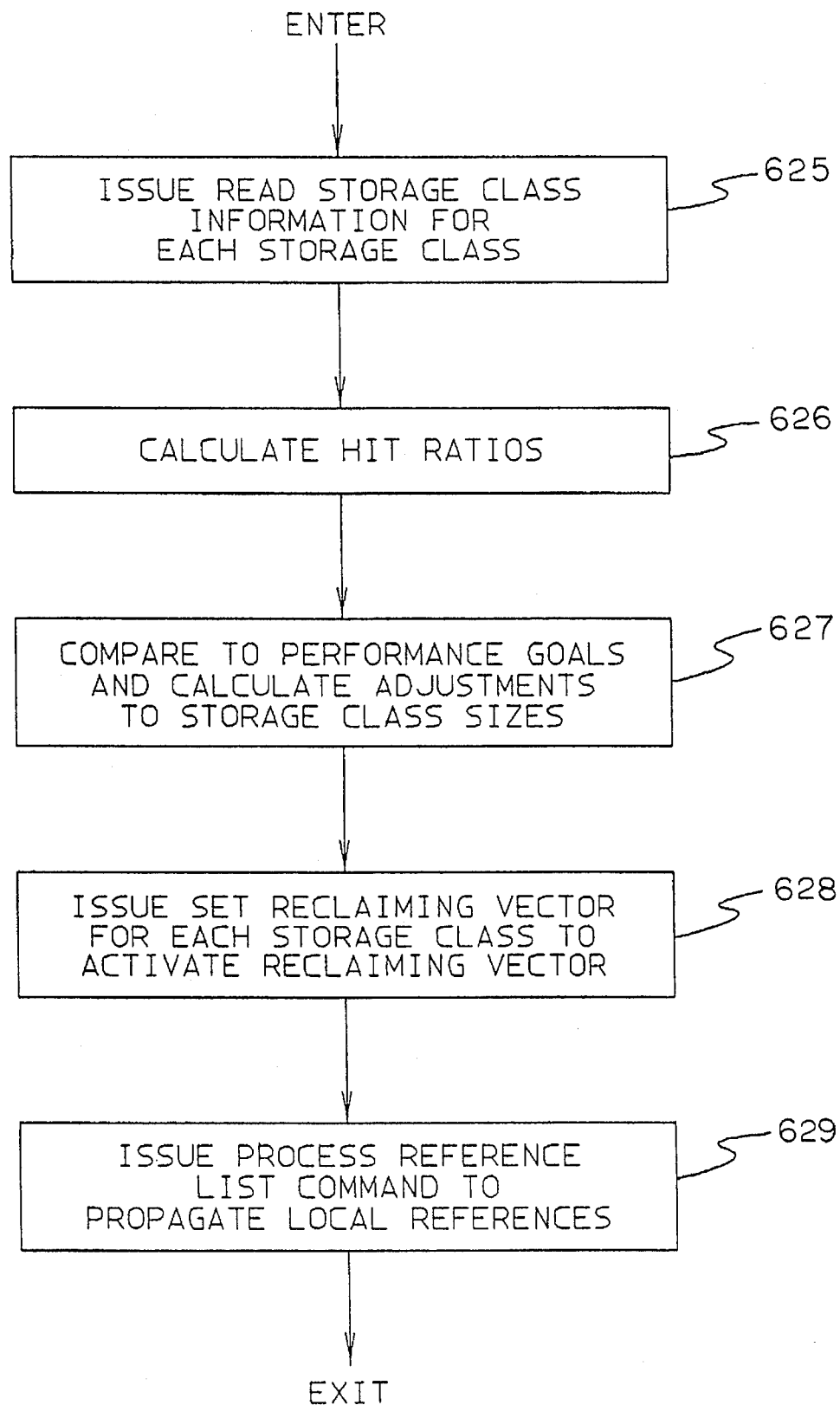
FIG. 6D is an overview of SES cache storage management.
Figure 6E:
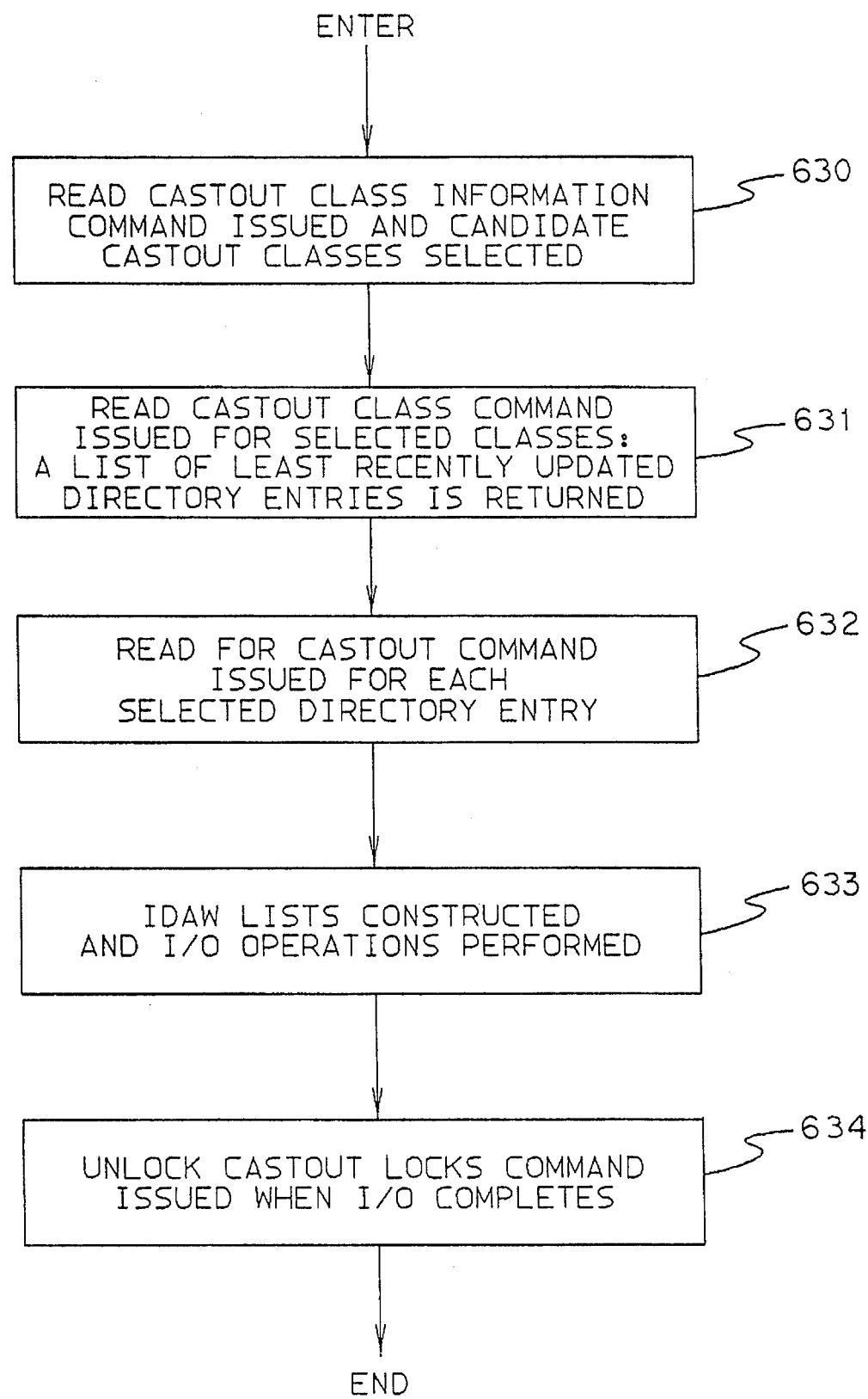
FIG. 6E is an overview of the migration of SES cache data to DASD.

During mainline operation, the buffer manager is also responsible for managing the storage of the SES cache (607 and detailed in FIG. 6D and 6E). The buffer manager is also responsible for managing the migration of changed data elements from the SES cache to DASD. The time out interval established during initialization causes the operating system to give control to processing routines on a periodic basis for management of SES cache storage and migration of SES cache data to DASD.

An overview of one protocol for managing the storage of a SES cache is shown in FIG. 6D. This processing is given control on a periodic interval established by the data base manager during initialization of use of the SES cache structure. The read storage class information command is issued for each storage class (625). Hit ratios for each storage class are calculated (626). The achieved hit ratios are compared to the performance goals set for each storage class and adjustments to storage class sizes are calculated (627). For each storage class in which a change of allocated SES resources is required, the set reclaiming vector command is issued to activate the reclaiming vector (628). The process reference list command is issued (629) for each storage class in which local buffer references have been recorded during mainline operation (614).

An overview of one protocol for managing the movement of data from the SES cache to DASD is shown in FIG. 6E. This processing is given control on a periodic interval established by the data base manager during initialization of use of the SES cache structure. The read castout class information command is issued for each cast out class and candidate castout classes are selected (630). The read castout class command is issued for each selected castout class (631). A list of least recently updated directory entries is returned. The read for castout command is issued for each selected directory entry (632). I/O requests are built to cause the data read from SES to be written to DASD (633). When the I/O operations have completed, the unlock castout locks command is issued (634).

When all data bases using a SES cache are no longer being accesses, the data base manager may disconnect from the SES cache (608). The data base manager may choose to migrate all modified data elements from the SES cache to DASD or leave the modified data elements in the SES cache. If there are no remaining modified data elements in the SES cache, the SES cache structure may be deallocated or remain allocated for future use. The data base manager invokes operating system services to disconnect from the SES cache structure (608). The operating system services determine if the SES cache structure is to be deallocated (609). If the SES cache structure is to be deallocated, the Deallocate Cache Structure command is invoked (610). The local buffer pool is then released by the data base manager (611).

Storage Class Assignment:

A storage class is assigned to a directory entry when the Read and Register, Write and Register, and Write When Registered commands are issued. Storing the storage class in the directory entry is performed as part of reference-signal processing. An additional function of reference-signal processing is to place the effected directory entry at the bottom of the storage-class queue. In one implementation a single storage class is utilized. In a second implementation multiple storage classes are utilized. In the second implementation, support is specified by the customer of storage classes. A parameter is provided, SES_LEVEL, which determines the relative amount of cache resources that are allocated to the data sets in a given SES_LEVEL. The cache resources allocated to data sets in a given level are adjusted periodically. The amount of cache resource dynamically allocated to data sets in a given level is a function of the relative importance of the level, the amount of activity against the level, and the usefulness of allocating more cache resources to the level to improve response time. The algorithms attempt to achieve minimum average response time for the entire cache. Through the use of multiple storage classes, single SES cache structure can be utilized while still delivering different levels of performance. For example, data in a performance classes with increasingly stringent requirements can occupy more space within the SES cache.

Reclaim Process and Cache Coherency:

The reclaiming process involves identifying a target storage class, locating the oldest unchanged directory entry or data-area in the target class, and detaching the directory entry or data-table entry from the directory.

When a directory entry is detached from the directory, the directory entry is marked invalid. The local-cache register is scanned, a cross-invalidate signal is issued for each valid entry, and the entry is invalidated. SES cache storage management processes uphold the data integrity maintained through processes described in patent application Ser. No. 07/860,805 (PO9-91-052). Issuing cross-invalidate signals when a directory entry is reclaimed prevents the following from occurring:

The directory entry with name X is reclaimed. Local copies remain valid, but their registration is no longer tracked by SES.

The name X is registered in a different directory entry and changed. Since the valid local copies are not registered in the new directory entry, no XI signals are issued, and the local buffers lose coherency.

Steal in Place:

The default storage management process performed by a SES cache structure maintains the balance of data and directory usage among storage classes. When the repeat-factor value is zero or when all storage-class counts equal zero, the reclaiming vector is inactive. If the reclaiming vector is inactive, the target storage class always is the specified storage class. If all storage classes have inactive reclaiming vectors and the free lists of directory and data elements are empty, the cache is in a default steal algorithm called "steal in place", where new resource assignments are satisfied by resources reclaimed strictly within the storage class. In an implementation which utilizes multiple storage classes, when SES storage usage is correctly assigned between storage classes, the "steal in place" algorithm is employed. Otherwise, the reclaiming vectors of storage classes is set to achieve a redistribution of SES storage among storage classes to achieve performance class goals.

Process Reference List Processes:

The process-reference-list command is used to propagate local-cache references to the storage-class queues. This orders the storage classes across both local-cache and SES-cache reference activity and prevents the reclaiming of directory entries and data-table entries with high local-cache activity. The program builds the name list, adding a name whenever a local-cache entry tests as valid, and periodically writes the name list to the SES cache with the process-reference list command.

The process-reference-list (PRL) command may be invoked on an event driven or timer driven basis. When the name list built by the program reaches a maximum size, the program may initiate the PRL command. Alternatively, the program may establish a time interval which, when expired, causes the PRL command to be issued. In either technique, tuning is required by the program to either modify the size of the name list or modify the duration of the interval. Changes to the frequency with which the PRL command is issued is controlled by observing the Completed-reference-lists counter (CRLC) and the Partially-completed-reference-lists counter (PCRLC). The CRLC and PCRLC are returned by the Read Storage Class Information command. When the CRLC value is high, the program will increase the size of the name list or increase the duration of the timer interval. It is expedient to decrease the frequency of PRL command issuance in order to minimize overhead associated with SES cache storage management. If the PCRLC value is high, the program will decrease the size of the name list or decrease the duration of the timer interval. It is expedient to increase the frequency of PRL command issuance in order to insure local cache reference patterns are correctly reflected at the SES cache.

Figure 16:
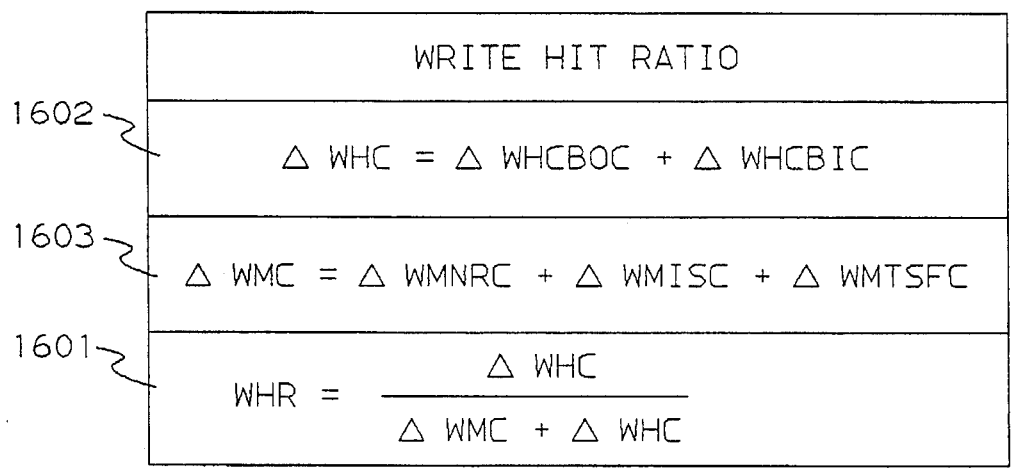
FIG. 16 enables the computation of a write-hit ratio (WHR) over a time interval.

Retrieving Storage Class Statistics:

On a periodic basic, programs which use a SES cache will retrieve statistics for a storage class using the Read Storage-Class Information command. Retrieval of statistics could be driven by target storage class full response codes returned on Read and Register, Write and Register, and Write When Registered commands. The Target Storage Class (TSTC) response operand identifies the target storage class when a reclaim operation has failed due to a full condition. Additionally, retrieval of statistics will be driven on a time driven basis. The counters returned identify the number of data area elements and the number of directory entires assigned to the storage class. The counters returned also enable calculation of the read-hit-ratio and write-hit-ratio as shown in FIG. 8 and FIG. 16. These counters are used by the program in establishing a reclaiming vector for storage classes which require reapportionment of SES cache resources.

Balancing for Storage Isolation:

One use of storage classes could be to isolate a set of data elements in SES. For example, it could be that a given area of a data base has frequent reference, such as might be the case for index records. Given the frequent reference of this data, it may tend to stay resident in the attached local caches. It may also be that updates to the index occur infrequently. Still, the directory element for such index data elements must remain resident in the SES cache in order to insure that any updates are correctly reflected in all local caches. The data for such index data elements may also reside in the SES cache in order to minimize the penalty for retrieving updated data elements. A second example of using storage classes for storage isolation purposes may be to address requirements for access to data elements which are not referenced frequently but when referenced are required with high performance. This type of data element may not reside in processor(s) local cache but can be made to stay resident in the SES cache by assigning these data elements to a storage class protected from reclaim by other storage classes. A side benefit of using a storage class for storage isolation purposes is that the requirement for issuing process-reference list commands is lessened or eliminated. If the data elements to be isolated in the SES cache are in a storage class which is not the target of reclaim activities for other storage classes, it will not matter how relatively old these data elements are compared to data elements in other storage classes.

As a very simple example, assume a SES cache to be used for 4K data elements with 1000 data elements and 1000 directory entries. Further, assume that two storage classes have been defined where one storage class is for general data access and the second storage class is to be used for storage isolation of index records for data sets which may or may not be being accessed at any point in time. For this example, assume that initially, the data sets for which isolation of index records is to be achieved are not being accessed and that all data elements are in use. All of the data elements would then be assigned to one of the two storage classes, for this example, storage class 1.

When a data set with an index for which high performance is desired is accessed, the index data elements will be stored in the SES cache in storage class 2. In order to reapportion the SES cache resources to enable the index data elements to remain resident in the SES cache, the reclaiming vector for storage class 1 would be left inactive. This will cause all reclaim processing to reuse directory entries and data elements from storage class 1. The reclaiming vector for storage class 2 would be set to cause no reclaiming from storage class 2 and to cause reclaiming to be performed from storage class 1. The value used in the reclaiming vector for storage class 2 for storage class 1 could be set to be unlimited or bounded to a maximum value so as not to use all of the SES cache resources. This example is easily extended to allow for multiple storage classes where reclaiming SES resources for the index data elements is balanced between the storage classes used for other data elements.

Balancing to Achieve Cache Hit Ratios:

A second use of storage classes is to balance SES cache resource utilization among competing performance groups of data. As an example, assume two performance groups of data have been defined by the customer. For the purposes of this example, assume that SES cache data access times are achieved in 100 microseconds and DASD data access times are achieved in 10 milliseconds. In the first performance group, the goal has been established as requiring 0.1 millisecond access on 90% of the data requests. In the second performance group, the goal has been established as requiring an average of 5 millisecond access to data.

To achieve these performance goals, assume the data manager has established two storage classes in a SES cache. To achieve the first performance goal, storage class 1 will required a 90% hit rate in the SES cache. To achieve the second performance goal, storage class 2 will require a 50% hit rate in the SES cache. The data manager will establish a timer driver algorithm which will heuristically establish reclaiming vectors for the two storage classes to best meet both performance goals given the real time demand of data elements in the two performance groups. Periodically, the algorithm will retrieve statistics for the two storage classes using the read-storage-class information command. Based on the counters retrieved, the read-hit-ratio and write-hit-ratio values will be calculated as in FIGS. 8 and 16. Based on the overall request rate for data from each performance group and the hit-ratios being achieved, the reclaiming vector for each storage class will be adjusted to allot more or less SES cache resource to each of the two storage classes.

Many variations and modifications which do not depart from the scope and spirit of the invention will now become apparent to those of skill in the art. Thus, it should be understood that the above described embodiments have been provided by way of example rather than as a limitation.

Having thus described our invention, what we claim as new and desire to secure by Letters Patent is:

1. A method of controlling data handling in a computer complex, comprising the steps of:

structuring a sysplex to include a plurality of central processor complexes (CPCs), in which each of the CPCs contains one or more control programs for controlling internal CPC operations, sysplex direct access devices (sysplex DASD) commonly connected to the CPCs for storing CPC shared data items permanently in the sysplex, and a shared electronic storage (SES) attached to the CPCs, controlling one of the CPCs to execute a program: issuing an allocation command to the SES with operand parameters specifying space in SES needed for setting up: cache controls, a cache directory, and a data area for receiving data items from attached CPCs to be stored in the SES cache, generating by SES of the SES cache when specified space exists in SES in response to the allocation command including generation of the cache controls, the cache directory, and the data area in the specfied space based on the specified operand parameters from which the SES cache is formed, the SES cache not previously existing in the SES, and the generating step providing in each cache directory entry a data name field and a storage class field, the data name field for receiving a name for a data item to be written in a corresponding data area in the cache and the storage class field for receiving an identifier of a storage class for the directory entry and the data item.

2. A method of controlling data handling in a computer complex, as defined in claim 1, comprising the steps of:

writing storage classes in the storage class fields to provide selective association of the storage classes with data items represented by corresponding directory entries for enabling reclaiming of unchanged data items and corresponding directory entries on a storage class basis for enabling a selective reclaiming of SES storage space for re-use by the SES cache.

3. A method of controlling data handling in a computer complex, as defined in claim 1, further comprising the step of:

providing a pool of free space from which new SES cache directory entries are allocated in the cache directory, and from which data areas are allocated for SES cache data items newly stored in the SES cache, and adding the reclaimed storage space to the pool of free space.

4. A method of controlling data handling in a computer complex, as defined in claim 3, further comprising the step of:

providing the pool of free space in two parts comprising a first part as a directory entry pool from which new SES cache directory entries are allocated, and a second part from which data areas are allocated for SES cache data items newly stored in the SES cache.

5. A method of controlling data handling in a computer complex, as defined in claim 2, further comprising the steps of:

registering in a SES cache directory entry of a common-name for a data item in response to a registration request to SES from a CPC identifying the common-name, and partitioning the SES cache directory into a plurality of storage class logical partitions by the CPCs designating storage class values in each registration request for SES cache directory entries in order to partition into storage classes the SES cache directory entries and data items associated with the directory entries which are stored in the SES cache, in which the locations of the logical partitions are independent of physical locations for the directory entries and data items.

6. A method of controlling data handling in a computer complex, as defined in claim 5, further comprising the steps of:

associating by the software in the CPC of storage classes for data items, and controlling by the software of SES cache storage based on the storage classes.

7. A method of controlling data handling in a computer complex, as defined in claim 5, further comprising the step of:

providing a storage class value in a new SES cache directory entry being generated for a request to SES by a CPC when no existing directory entry is found in the SES cache directory.

8. A method of controlling data handling in a computer complex, as defined in claim 5, further comprising the steps of:

providing a request from a CPC with a common-name of an associated data item (which may or may not be stored in the SES cache) for locating any existing SES cache directory entry designating the common-name, and designating a storage class value in the request for requiring a cache directory entry having the common-name to be assigned to the requested storage class value.

9. A method of controlling data handling in a computer complex, as defined in claim 8, further comprising the step of:

changing an existing SES cache directory entry from one logical storage class partition to another storage class partition in a SES cache by a CPC providing a new storage class value in a request for accessing an existing SES cache directory entry.

10. A method of controlling data handling in a computer complex, as defined in claim 6, further comprising the step of:

reclaiming a SES cache directory entry within a storage class for a newly allocated SES cache directory required by a command for assigning a new directory entry in SES when no space is available in a pool of free space from which new SES cache directory entries are provided.

11. A method of controlling data handling in a computer complex, as defined in claim 10, further comprising the step of:

also reclaiming whatever SES cache data area is being used by any data item associated with a SES cache directory entry being reclaimed in a storage class by putting a representation of each reclaimed data area in a pool of free space from which cache data space is allocated for data items newly stored in the SES cache.

12. A method of controlling data handling in a computer complex, as defined in claim 10, further comprising the steps of:

identifying a target storage class among the plural storage classes in a SES cache, and performing the reclaiming step in the target storage class.

13. A method of controlling data handling in a computer complex, as defined in claim 12, further comprising the step of:

the step of SES generating the cache controls including generating reclaiming controls having at least a reclaiming vector containing a plurality of reclaiming vector elements, setting a reclaiming vector to an active or inactive state for operation of the reclaiming step for a storage class in a SES cache, the active state allowing operation of the reclaim vector and the inactive state preventing operation of the reclaim vector for the storage class, the reclaim vectors (RVs) comprised of RV elements indicating a number of directory entries allowed for each respective storage class to steal from another storage class, and the inactive state being indicated by a predetermined count value for which other count values indicate the active state.

14. A method of controlling data handling in a computer complex, as defined in claim 13, further comprising the step of:

designating a default target storage class for the storage class specified in a SES command requesting registration of a common-name of a data item when the reclaiming vector is in an inactive state.

15. A method of controlling data handling in a computer complex, as defined in claim 12, further comprising the step of:

activating a reclaiming vector comprised of reclaiming vector elements for a storage class specified in a set-reclaiming-vector command issued by a CPC by setting one or more of the reclaiming vector elements to a non-zero state, and the reclaiming vector being inactive when all reclaiming vector elements are set to a zero state.

16. A method of controlling data handling in a computer complex, as defined in claim 12, further comprising the step of:

responding by SES to a CPC request specifying a storage class by providing a response signal that indicates whether or not a target storage class is in a reclaim full condition indicating no directory entry in the target storage class represents an unchanged data item.

17. A method of controlling data handling in a computer complex, as defined in claim 10, further comprising the steps of:

ordering SES directory entries having an unchanged indication in each storage class by recency of access reference to the directory entries in the storage class, and reclaiming in any storage class of directory entries associated with unchanged data items and directory entries not associated with any data item according to the ordering of the SES directory entries by the ordering step.

18. A method of controlling data handling in a computer complex, as defined in claim 17, further comprising the steps of:

providing a representation of each referenced directory entry (as a currently most recently used (MRU) directory entry) at one end of a recency sequence of representations of directory entries in a respective storage class ordered by recency of access to the directory in the storage class, and locating a least recently used (LRU) directory entry at an opposite end of the recency sequence of directory entry representations in which the LRU entry is a candidate for being next reclaimed in the storage class.

19. A method of controlling data handling in a computer complex, as defined in claim 18, further comprising the step of:

providing a queue structure for containing representations of the directory entries in the recency sequence for the storage class, in which the locations of the MRU entry representation and the LRU entry representation in the queue (at opposite ends of the queue) are provided in a queue anchor element.

20. A method of controlling data handling in a computer complex, as defined in claim 19, further comprising the step of:

inserting a pointer (address) to a directory entry at the MRU end of the queue for representing the directory entry at the time the entry is currently being accessed (referenced).

21. A method of controlling data handling in a computer complex, as defined in claim 18, further comprising the step of:

accessing a directory entry representation from the LRU end of the queue for performing the reclaiming step in a specified storage class when the storage class is enabled.

22. A method of controlling data handling in a computer complex, as defined in claim 15, further comprising the step of:

loading the reclaiming vector values for the specified storage class from values provided by the set-reclaiming-vector command for the target storage classes.

23. A method of controlling data handling in a computer complex, as defined in claim 15, further comprising the step of:

setting a repeat factor element for the specified storage class from a repeat factor value contained in the set-reclaiming-vector command.

24. A method of controlling data handling in a computer complex, as defined in claim 15, further comprising the steps of:

the step of SES generating the cache controls including generating reclaiming controls having a reclaiming counter corresponding to each reclaiming vector element, activating the reclaiming vector by initializing a reclaiming counter for a storage class with a corresponding reclaiming value in the reclaiming vector, and initializing a reclaiming cursor to indicate a first enabled reclaiming counter.

25. A method of controlling data handling in a computer complex, as defined in claim 10, further comprising the steps of:

performing the operation of a SES command issued by a CPC which requires a SES directory entry or SES data area not currently assigned, and assigning a SES directory entry or a SES data area from a free pool when the free pool exists.

26. A method of controlling data handling in a computer complex, as defined in claim 25, further comprising the step of:

performing the reclaiming step from the specified storage class in the command when a reclaiming vector is in an inactive state.

27. A method of controlling data handling in a computer complex, as defined in claim 25, further comprising the step of:

performing the reclaiming step from the target storage class indicated by a reclaiming cursor.

28. A method of controlling data handling in a computer complex, as defined in claim 27, further comprising the step of:

decrementing a reclaiming counter located by the reclaiming cursor for the target storage class.

29. A method of controlling data handling in a computer complex, as defined in claim 28, further comprising the step of:

changing the cursor to locate a next enabled reclaiming counter when the decrementing step reaches a disabling value.

30. A method of controlling data handling in a computer complex, as defined in claim 28, further comprising the steps of:

decrementing a repeat factor when all reclaiming counters have reached the disabling value, and reloading the reclaiming counters from a reclaiming vector for a specified storage class.

31. A method of controlling data handling in a computer complex, as defined in claim 30, further comprising the step of:

setting a reclaiming vector to an inactive state when a repeat factor has reached a disabling value and all reclaiming counters have reached respective disabling values.

32. A method of controlling data handling in a computer complex, as defined in claim 6, further comprising the steps of:

providing for each storage class of a set of event counters maintained in SES for counting read-hit and read-miss events in SES due to read commands from CPCs to SES, and providing for each storage class of a set of event counters maintained in SES for counting write-hit and write-miss events in SES due to write commands from CPCs to SES.

33. A method of controlling data handling in a computer complex, as defined in claim 32, further comprising the step of:

providing for each storage class of a set of event counters maintained in SES for respectively counting read-hits, read- misses, directory hits, read misses with common-name assignment suppressed, read misses with successful common- name assignment, read misses with target storage class full, write hits with change bit indicating not changed, write hits with change bit indicating changed, write miss not registered, write miss data cached in invalid state, and write miss target storage class full.

34. A method of controlling data handling in a computer complex, as defined in claim 32, further comprising the steps of:

retrieving count statistics from SES for read-hit and read-miss events for a storage class specified with a read-storage-class-information command, determining a total number of read-hit and read-misses events occurring for the storage class since a last issuance of a read-storage-class command, and calculating a read-hit ratio for the storage class by dividing the read-hit count by a sum of a read-hit count for the storage class and a read-miss count over a last time interval.

35. A method of controlling data handling in a computer complex, as defined in claim 34, further comprising the steps of:

retrieving counter statistics from SES for write-hit and write-miss events for a storage class specified with a read-storage-class-information command, determining a total number of write-hit and write-misses events occurring since a last issuance of a read-storage-class command, and calculating a write-hit ratio for the storage class by dividing the write-hit count by a sum of a write-hit count for the storage class and a write-miss count over a last time interval.

36. A method of controlling data handling in a computer complex, as defined in claim 35, further comprising the step of:

establishing new vector counts for a reclaiming vector elements for each storage class to effect redistribution across storage classes of SES storage resources for assignment to directory entries and data items in accordance with pre-determined read-hit ratios and write-hit ratio performance values.

37. A method of controlling data handling in a computer complex, as defined in claim 36, further comprising the step of:

retrieving counter statistics from SES for an amount of storage assigned to directory entries and data items for a specified storage class with a read-storage-class-information command.

38. A method of controlling data handling in a computer complex, as defined in claim 38, further comprising the step of:

establishing new vector counts for the reclaiming vector elements for each storage class to effect redistribution across storage classes of SES storage resources for assignment to directory entries and data items in accordance with pre-determined performance values.

39. A method of controlling data handling in a computer complex, as defined in claim 18, further comprising the steps of:

generating a list of names of active data items in buffers of a CPC, and referencing entries associated with common-names in a SES cache directory to move representations of the directory entries to the MRU end of queues for storage classes associated with the directory entries to prevent representations of the entries from reaching the LRU end of the queues where the entries would become candidates for reclaiming.

40. A method of controlling data handling in a computer complex, as defined in claim 39, further comprising the step of:

providing a command to send a CPC list of common-names of active data items to an attached SES cache.

41. A method of controlling data handling in a computer complex, as defined in claim 29, further comprising the step of:

selecting zero as the disabling reclaiming value for any any storage class, and selecting a positive non-zero value for an incremental reclaiming value to enable operation of the reclaiming step for any storage class.

42. A method of controlling data handling in a computer complex, as defined in claim 6, further comprising the steps of:

providing for each storage class a counter for indicating the current number of directory entries in a respective storage class in the SES cache, decrementing the counter for a storage class that has a directory entry reclaimed or changed to a different storage class by storing a different storage class value in the directory entry, and incrementing the counter for the storage class whenever a directory entry is assigned to the storage class.

43. A method of controlling data handling in a computer complex, as defined in claim 6, further comprising the steps of:

providing for each storage class a counter for indicating the amount of storage in use for storage items in the storage class, decrementing the counter when space used by data items in the storage class is decreased for directory entries associated with the data items stored in the SES cache, and incrementing the counter for the storage class when the space used by the data items in the storage class is increased.

44. A method of controlling data handling in a computer complex, as defined in claim 1, further comprising the steps of:

terminating a SES cache allocation process by storing checkpoint assessment information in SES and sending it to a CPC if the allocation is not completed in a predetermined timeout period, issuing by a program in a CPC at a later time with parameters to continue generating the SES cache from the point at which the checkpoint information indicates cache generation terminated, generating the SES cache to completion if the completion occurs within a predetermined timeout period, and responding to the CPC issuing the allocation command with a completion signal when completion has occurred.

45. A method of controlling data handling in a computer complex, as defined in claim 1, further comprising the steps of:

removing a SES cache from a SES by a program in a CPC by:

issuing a deallocate-cache-structure command with specified parameters for removing the cache, controlling removal of the SES cache by a process within SES, and responding to the CPC issuing the command with a completion signal when completion of the removal has occurred.

46. A method of controlling data handling in a computer complex, as defined in claim 6, further comprising the steps of:

transmitting a read-directory command from a CPC to a SES cache for requesting information on one or more named data items, scanning entries in the SES cache directory for generating a name list or a list of directory-entry-information-blocks without the scanning step being affected by changes to directory entries during the scanning step, and responding to the command by SES sending to the CPC the name list or the list of directory-entry-information-blocks.

47. A method of controlling data handling in a computer complex, as defined in claim 46, further comprising the step of:

specifying a common-name and name mask in a write command to define a set of related common-names for the scanning step to find entries in the directory for generating the name list or the list of directory-entry-information-blocks.

48. A method of controlling data handling in a computer complex, as defined in claim 47, the providing step further comprising:

provviding in each directory-entry-information block for an associated data item of: common-name, storage class and user-data field found in an associated SES cache directory entry.

49. A method of controlling data handling in a computer complex, as defined in claim 6, further comprising the steps of:

issuing to SES of a read directory command by a CPC with a reset request, the command also having a mask with an associated common-name for finding all entries in the directory that comply with the mask applied to the common-name, resetting by SES of a reference indicating field in each directory entry found to have a common-name complying with the mask, and incrementing a reference count for each reset of a directory entry.

50. A method of controlling data handling in a computer complex, as defined in claim 6, further comprising the steps of:

issuing to SES by a CPC of a read-storage-class information command designating a storage class for which information is being requested, accessing by SES of a queue for the designated storage class, and accessing through the queue of SES cache directory entries associated with the storage class, and sending to the CPC of current contents of measurement counters maintained in real time by SES for the designated storage class to enable the CPC to obtain information on the storage class.

\* \* \* \* \*

UNITED STATES PATENT AND TRADEMARK OFFICE
CERTIFICATE OF CORRECTION

PATENT NO. : 5,457,793
DATED : Oct. 10, 1995
INVENTOR(S) : David A. Elko et al.

It is certified that error appears in the above-indentified patent and that said Letters Patent is hereby corrected as shown below:

ON THE TITLE PAGE:

In the Title:

Delete "Supplex" and substitute therefor --Sysplex--.

Signed and Sealed this

Eleventh Day of June, 1996

Attest:

BRUCE LEHMAN

Attesting Officer

Commissioner of Patents and Trademarks